(12) United States Patent
Luo et al.

(10) Patent No.: US 10,140,875 B1
(45) Date of Patent: Nov. 27, 2018

(54) METHOD AND APPARATUS FOR JOINT OPTIMIZATION OF MULTI-UAV TASK ASSIGNMENT AND PATH PLANNING

(71) Applicant: Hefei University of Technology, Hefei, Anhui (CN)

(72) Inventors: He Luo, Anhui (CN); Guoqiang Wang, Anhui (CN); Zhengzheng Liang, Anhui (CN); Xiaoxuan Hu, Anhui (CN); Shanlin Yang, Anhui (CN); Huawei Ma, Anhui (CN); Wei Xia, Anhui (CN); Peng Jin, Anhui (CN); Moning Zhu, Anhui (CN); Yanqiu Niu, Anhui (CN); Xiang Fang, Anhui (CN)

(73) Assignee: HEFEI UNIVERSITY OF TECHNOLOGY, Hefei (CN)

( * ) Notice: Subject to any disclaimer, the term of this patent is extended or adjusted under 35 U.S.C. 154(b) by 0 days.

(21) Appl. No.: 15/953,881

(22) Filed: Apr. 16, 2018

(30) Foreign Application Priority Data

May 27, 2017 (CN) .......................... 2017 1 0393464

(51) Int. Cl.
*G08G 5/00* (2006.01)
*G06Q 10/04* (2012.01)
(Continued)

(52) U.S. Cl.
CPC ......... *G08G 5/0043* (2013.01); *B64C 39/024* (2013.01); *G06N 3/126* (2013.01);
(Continued)

(58) Field of Classification Search
CPC .... G08G 5/0043; B64C 39/024; G06N 3/126; G06Q 10/047
See application file for complete search history.

(56) References Cited

U.S. PATENT DOCUMENTS

2014/0257692 A1  9/2014  Stefani et al.
2015/0266575 A1*  9/2015  Borko .................. B64C 39/024
                                              701/3
2017/0235316 A1*  8/2017  Shattil ................. B64C 39/024
                                              701/3

FOREIGN PATENT DOCUMENTS

CN    103471592 A    12/2013
CN    103699106 A    4/2014
(Continued)

OTHER PUBLICATIONS

First Office Action of Chinese Patent Application No. 201710393464.7 dated Dec. 8, 2017.

*Primary Examiner* — Krishnan Ramesh
(74) *Attorney, Agent, or Firm* — Wegman, Hessler & Vanderburg

(57) ABSTRACT

The embodiments of the present invention disclose a method and apparatus for joint optimization of multi-UAV task assignment and path planning. The method comprises: obtaining the location information of a plurality of UAVs and a plurality of target points, the dispersion of groundspeed course angle, and motion parameters of each UAV and wind field; constructing an initial population based on the location information, the dispersion of groundspeed course angle and a preset genetic algorithm; determining the flight status of each UAV and the flight time taken by each UAV to complete a path segment of the corresponding Dubins flight path based on the initial population and the motion parameters, obtaining the total time taken by all the UAVs corresponding to each chromosome to complete the task based on the flight time of the path segment; and subjecting the chromosomes in the initial population to crossover and mutation based on the genetic algorithm and, when a predetermined number of iterations is reached, selecting the optimal Dubins flight path as the joint optimization result. In (Continued)

the embodiments of the present invention, the UAV flight path planning problem is combined with the actual flight environment of the UAV, so that the optimal flight path obtained is superior to the solution in which the UAV speed is constant.

10 Claims, 9 Drawing Sheets

(51) Int. Cl.
     *G06N 3/12*         (2006.01)
     *B64C 39/02*      (2006.01)

(52) U.S. Cl.
     CPC ......... *G06Q 10/047* (2013.01); *G08G 5/0013* (2013.01); *G08G 5/0026* (2013.01); *G08G 5/0039* (2013.01); *B64C 2201/141* (2013.01)

(56) References Cited

FOREIGN PATENT DOCUMENTS

| | | |
|---|---|---|
| CN | 105512769 A | 4/2016 |
| CN | 105929848 A | 9/2016 |
| CN | 106406346 A | 2/2017 |

\* cited by examiner

| Target Point Code | 3 | 1 | 2 |
| Course Angle Code | 30 | 10 | 20 |
| UAV Code | 1 | 2 | 2 |
Fig. 4a
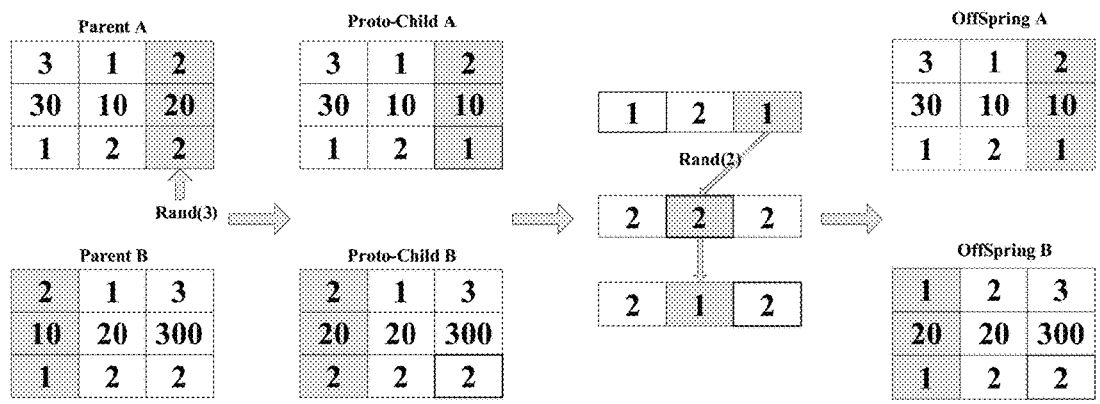
Fig. 4b
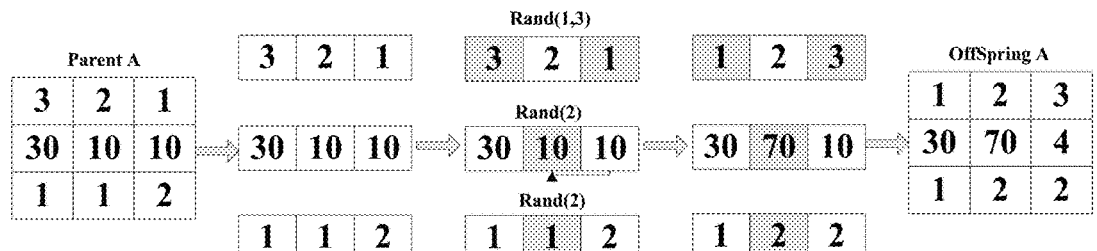
Fig. 4c

METHOD AND APPARATUS FOR JOINT OPTIMIZATION OF MULTI-UAV TASK ASSIGNMENT AND PATH PLANNING

CROSS REFERENCE TO RELATED APPLICATIONS

This application claims priority to Chinese Application No. 201710393464.7, filed on May 27, 2017, entitled "Method and Apparatus for Joint Optimization of Multi-UAV Task Assignment and Path Planning", which is specifically and entirely incorporated by reference.

FIELD OF THE INVENTION

Embodiments of the present invention relate to the technical field of unmanned aerial vehicle (UAV), and in particular, to a method and apparatus for joint optimization of multi-UAV task assignment and path planning.

BACKGROUND OF THE INVENTION

Currently, UAVs are widely used in military and civilian fields to accomplish various types of tasks such as target reconnaissance, target tracking, intelligence gathering, post-quake rescue and geological exploration. For example, in the case of collaborative target reconnaissance by multiple UAVs, it is necessary to allocate the most appropriate reconnaissance target to each UAV, and also to plan an optimal flight path for each UAV. This concerns the joint optimization of task assignment and path planning constrained by a plurality of factors and is also a non-deterministic problem.

With the deepening of UAV research, environmental factors are gradually incorporated into the study. Especially with respect to the UAV task assignment, path planning and flight control, it is the main tasks of the current UAV research in terms of how to reduce the UAV energy consumption and how to control the flight state to enable the UAV to perform most tasks with least fuel consumption with better task performance and higher security under the influence of such environmental factors. Currently, the models commonly used to solve the UAV task assignment and task planning problems include TSP (Traveling Salesman Problem) model, TOP (Team Orienteering Problem) model and VRP (Vehicle Routing Problem) model. The TSP model minimizes the path cost of the traveler after passing through all the given target points when there is only a single traveler. The TOP model allows each teamer to visit as many target points as possible, thereby maximizing the total return of all teamers when there are multiple teamers. The VRP model allows the vehicle to visit a certain number of target points where each target point can only be visited once, thereby minimizing the total distance or total time consumed by the UAVs when there is a fixed number of vehicles.

In the process of implementing the embodiments of the present invention, the inventor finds that in the actual operation of the existing technical solutions, it is generally assumed that the speed of the UAV in the model is constant within a constant time. However, this assumption is obviously unrealistic. As a result, it is impossible to accurately simulate the UAV's actual state of motion using the model, and thus achieve optimal path planning.

SUMMARY OF THE INVENTION

It is an object of the embodiments of the present invention to solve the problem that in the prior art, because the UAV speed in the model used for path planning is assumed to be constant, it is impossible to accurately simulate the UAV's actual state of motion using the model, and thus achieve optimal path planning.

The embodiments of the present invention provide a method for joint optimization of multi-UAV task assignment and path planning, comprising:

a step S1 of obtaining the location information of a plurality of UAVs and a plurality of target points, the dispersion of groundspeed course angle of the UAVs, and motion parameters of each UAV and wind field;

a step S2 of constructing an initial population based on the location information of the plurality of UAVs and the plurality of target points, the dispersion of groundspeed course angle of the UAVs and a preset genetic algorithm, each chromosome in the initial population including the same number of Dubins flight paths as the number of UAVs and each of the Dubins flight paths being completed by a different UAV;

a step S3 of determining the flight status of each UAV and the flight time taken by each UAV to complete a path segment of the corresponding Dubins flight path based on the initial population and the motion parameters of each UAV and wind field, and obtaining the total time taken by all the UAVs corresponding to each chromosome in the initial population to complete the task based on the flight time of the path segment and an MUAV-VS-DVRP model; and a step S4 of subjecting the chromosomes in the initial population to crossover and mutation based on the genetic algorithm and, when a predetermined number of iterations is reached, selecting the Dubins flight path corresponding to the chromosome with all the UAVs taking the shortest time to complete the task as the jointly-optimized task assignment and path planning scheme for the UAVs.

Optionally, the step of constructing the initial population based on the location information of a plurality of UAVs and a plurality of target points comprises:

performing chromosome coding according to coding scheme of the preset genetic algorithm to generate an initial population of a predetermined size; the chromosome consisting of target point information, UAV groundspeed course angle information and UAV information; wherein the target point belongs to a set $T=\{T_0, T_1, T_2, \ldots, T_{N_T}\}$, in which $T_0$ represents a starting point of the UAVs, the UAV groundspeed course angle belongs to a set $$H = \left\{ \beta_{gi}; \beta_{gi} = \frac{2\pi i}{N_g}, i = 0, 1, \ldots, N_g - 1 \right\},$$

in which $N_g$ represents the dispersion of groundspeed course angle of the UAVs, and the UAV belongs to a set $U=\{U_1, U_2, \ldots, U_{N_U}\}$, in which $N_U$ represents the number of UAVs; wherein the first row in the chromosome is a random full permutation of the target points, the second row is a corresponding groundspeed course angle randomly selected for each target point based on the dispersion of course angle of the UAVs, and the third row is a corresponding UAV randomly selected for each target point based on the set of UAVs, it is ensured that all the UAVs in the set of UAVs are selected at least once.

Optionally, the step of determining the flight status of each UAV and the flight time taken by each UAV to complete a path segment of the corresponding Dubins flight path based on the initial population and the motion parameters of each UAV and wind field, and obtaining the total time taken by all the UAVs corresponding to each chromosome in the initial population to complete the task based on the flight time of the path segment and an MUAV-VS-DVRP model comprises:

dividing the Dubins flight path corresponding to each chromosome into a plurality of path segments based on the order in which the target points comprised in the flight path are visited;

determining the UAV flight status based on the coordinates and course angle of the starting and ending points corresponding to each path segment in combination with wind field parameters and thus obtaining the flight time taken by the UAV to complete the path segment; and obtaining the total time taken by all the UAVs corresponding to the chromosome to complete the task based on the flight time corresponding to each path segment.

Optionally, determining the UAV flight status based on the coordinates and course angle of the starting and ending points corresponding to each path segment in combination with wind field parameters and thus obtaining the flight time taken by the UAV to complete the path segment comprises:

calculating the flight time of a UAV $U_i$ that flies from a target point $T_j$ at a groundspeed course angle $\beta_{gj}$ to a target point $T_k$ at a groundspeed course angle $\beta_{gk}$ according to the following formula:

$$t^i_{(T_j,\beta_{gj},T_k,\beta_{gk})} = \sum_{\theta=\beta_{gj}}^{\beta_{gk}} \int_\theta^{\theta+\Delta\theta} \frac{r_{min}}{V_g^i} d\theta, \forall U_i \in U, \forall T_j, T_k \in T$$

wherein $U_i$ represents the UAV performing the task, U represents the set of UAVs, $T_j$ represents the starting point, $\beta_{gj}$ represents the course angle of the UAV at the starting point, $T_k$ represents the ending point, $\beta_{gk}$ represents the course angle of the UAV at the ending point, T represents the set of target points, $r_{min}$ represents the minimum turning radius of the UAV, and $V_g^i$ represents the ground speed of the UAV $U_i$, $\Delta\theta$ is the angular rotation of the UAV $U_i$ and $V_g(\theta)$ is the ground speed of UAV $U_i$ when the groundspeed course angle is $\theta$;

obtaining ground speed of the UAV according to the following formula:

$$\begin{pmatrix} \cos\beta_g^i \\ \sin\beta_g^i \end{pmatrix} \cdot V_g^i = \begin{pmatrix} \cos\beta_a^i & \cos\beta_w^i \\ \sin\beta_a^i & \sin\beta_w^i \end{pmatrix} \begin{pmatrix} V_a^i \\ V_w^i \end{pmatrix}$$

wherein $V_a^i$ represents the airspeed, $\beta_a^i$ represents the airspeed course angle, $V_g^i$ represents the groundspeed, $\beta_g^i$ represents the groundspeed course angle, $V_w^i$ represents the wind speed, and $\beta_w^i$ represents the wind direction.

Optionally, obtaining the total time taken by all the UAVs corresponding to each chromosome in the initial population to complete the task based on the flight time and the MUAV-VS-DVRP model comprises:

obtaining the flight time according to the MUAV-VS-DVRP model:

$$J = \max \left\{ \sum_{j=0}^{N_T} \sum_{k=0}^{N_T} X^i_{(T_j,\beta_{gj},T_k,\beta_{gk})} t^i_{(T_j,\beta_{gj},T_k,\beta_{gk})}, i=1, K, N_U \right\}$$

wherein the constraints are:

$$\sum_{i=1}^{N_U} \sum_{k=1}^{N_T} \sum_{gk=0}^{N_g-1} \sum_{gj=0}^{N_g-1} X^i_{(T_j,\beta_{gj},T_k,\beta_{gk})} = 1, \forall T_j \in T$$

$$\sum_{k=1}^{N_T} \sum_{gk=0}^{N_g-1} \sum_{i=1}^{N_U} X^i_{(T_0,\beta_{g0},T_k,\beta_{gk})} = \sum_{k=1}^{N_T} \sum_{gk=0}^{N_g-1} \sum_{i=1}^{N_U} X^i_{(T_k,\beta_{gk},T_0,\beta_{g0})} = N_U$$

$$\sum_{i=1}^{N_U} \sum_{j=0}^{N_T} \sum_{gj=0}^{N_g-1} \sum_{k=0}^{N_T} \sum_{gk=0}^{N_g-1} X^i_{(T_j,\beta_{gj},T_k,\beta_{gk})} = N_T + N_U$$

wherein $\beta_{gj}$ and $\beta_{gk}$ represent the course angle of UAV $U_i$ at two target points $T_j$ and $T_k$ respectively, $t^i_{(T_j,\beta_{gj},T_k,\beta_{gk})}$ represents the flight time of UAV $U_i$ flying from a target point $T_j$ at a groundspeed course angle $\beta_{gj}$ to a target point $T_k$ at a groundspeed course angle $\beta_{gk}$, $X^i_{(T_j,\beta_{gj},T_k,\beta_{gk})}$ is a binary decision variable that is equal to 1 if the UAV $U_i$ flies from a target point $T_j$ at a groundspeed course angle $\beta_{gj}$ to a target point $T_k$ at a groundspeed course angle $\beta_{gk}$, otherwise equal to 0, $N_T$ represents the number of target points, and $N_g$ represents the dispersion of groundspeed course angle of the UAVs.

Optionally, the step of subjecting the chromosomes in the initial population to crossover and mutation based on the genetic algorithm and, when a predetermined number of iterations is reached, selecting the Dubins flight path corresponding to the chromosome with all the UAVs taking the shortest time to complete the task as the jointly-optimized task assignment and path planning scheme for the UAVs comprises:

a first step of generating an initial solution and an initial population of a predetermined size using the coding scheme, and calculating fitness of each chromosome in the population based on the time taken by the chromosome to complete the task, wherein the initial solution is the generated first chromosome;

a second step of subjecting two individuals (A, B) selected from the parent population by roulette wheel selection method to crossover. The rule of the crossover comprises: step 1, randomly selecting a crossover position in the individual A, then finding a gene in the individual B that is the same as the first row at the crossover position of the individual A, replacing the genes at the crossover position in the chromosomes A and B to obtain new chromosomes C and D, and then skipping to step 2; step 2, determining whether the chromosomes C and D satisfy constraints of the MUAV-VS-DVRP model, if so, skipping to step 3, otherwise, skipping to step 4; step 3, replacing the chromosomes A and B in the population with the chromosomes C and D and skipping to step 7; step 4, performing constraint check for the chromosomes that do not satisfy the constraints, that is, when it is determined that the number of UAVs in the chromosomes A and B does not satisfy the constraints, randomly selecting a gene locus in the chromosome that does not satisfy the constraints and determining whether there exists two or more UAV codes at this gene locus, if yes, skipping to step 5, otherwise skipping to step 6; step 5, placing the missing UAV code into the gene locus and skipping to step 7; step 6, re-selecting a gene locus to generate a chromosome satisfying the constraints to replace the chromosomes A and B, and then skipping to step 7; step 7, iteratively updating the population of the first step to obtain a new offspring population;

a third step of subjecting a chromosome selected from the population of the second step by roulette wheel selection method to mutation, the mutation including at least one of target point mutation of the first row of the chromosome, groundspeed course angle mutation of the second row of the chromosome, and UAV mutation of the third row of the chromosome;

the mutation process of the entire chromosome comprises the following steps: step 1, if mutation has occurred to the order of the first row of the chromosome, randomly selecting two gene locus of the current chromosome and exchanging target point codes at the corresponding gene locus, and then skipping to step 2; step 2, determining whether mutation has occurred to the second row and the locus of mutation and, if the mutation has occurred, randomly generating a value different from the groundspeed course angle code of the UAV at the current locus to replace the initial code, and then skipping to step 3; step 3, determining whether mutation has occurred to the third row and the locus of mutation and, if the mutation has occurred, skipping to step 4, otherwise skipping to step 8; step 4, randomly generating a value different from the UAV code at the current locus to replace the initial code, and after the mutation, determining whether the resulting chromosome satisfies the constraints of the MUAV-VS-DVRP model, if so, skipping to step 8, otherwise skipping to step 5; step 5, performing constraint check for the chromosome that does not satisfy the constraints such that when it is determined that the number of UAVs in the chromosome does not satisfy the constraints, randomly selecting a gene locus in the chromosome that does not satisfy the constraints and determining whether there exists two or more UAV codes at said gene locus, if yes, skipping to step 6, otherwise skipping to step 7; step 6, placing the missing UAV code into the gene locus and skipping to step 8; step 7, re-selecting a gene locus to generate a chromosome satisfying the constraints to replace the chromosomes in the population and skipping to step 8; step 8, replacing the chromosome in the population with the resulting chromosome and iteratively updating the population of the second step to obtain a new offspring population;

a fourth step of calculating the fitness of the offspring population and selecting the optimal solution from all the solutions in the this iteration; and a fifth step of determining whether the current number of iterations reaches a preset value; if no, combining the offspring population and the parent population in the third step according to a certain proportion to form a new parent population and returning to the second step; and if yes, ending the iteration and taking the ultimate optimal solution as the UAV task assignment and path planning result.

The embodiments of the present invention provide an apparatus for joint optimization of multi-UAV task assignment and path planning, comprising:

an acquisition module configured to obtain the location information of a plurality of UAVs and a plurality of target points, the dispersion of groundspeed course angle of the UAVs, and motion parameters of each UAV and wind field;

a first processing module configured to construct an initial population based on the location information of the plurality of UAVs and the plurality of target points, the dispersion of groundspeed course angle of the UAVs and a preset genetic algorithm, each chromosome in the initial population including the same number of Dubins flight paths as the number of UAVs and each of the Dubins flight paths being completed by a different UAV;

a second processing module configured to determine the flight status of each UAV and the flight time taken by each UAV to complete a path segment of the corresponding Dubins flight path based on the initial population and the motion parameters of each UAV and wind field, and to obtain the total time taken by all the UAVs corresponding to each chromosome in the initial population to complete the task based on the flight time of the path segment and an MUAV-VS-DVRP model; and a third processing module configured to subject the chromosomes in the initial population to crossover and mutation based on the genetic algorithm and, when a predetermined number of iterations is reached, select the Dubins flight path corresponding to the chromosome with all the UAVs taking the shortest time to complete the task as the jointly-optimized task assignment and path planning scheme for the UAVs.

Optionally, the first processing module is further configured to perform chromosome coding according to coding scheme of the preset genetic algorithm to generate an initial population of a predetermined size; the chromosome consisting of target point information, UAV groundspeed course angle information and UAV information; wherein the target point belongs to a set $T=\{T_0, T_1, T_2, \ldots, T_{N_T}\}$, in which $T_0$ represents a starting point of the UAVs, the UAV groundspeed course angle belongs to a set $$H = \left\{\beta_{gi}; \beta_{gi} = \frac{2\pi i}{N_g}, i = 0, 1, \ldots, N_g - 1\right\},$$

in which $N_g$ represents the dispersion of groundspeed course angle of the UAVs, and the UAV belongs to a set $U=\{U_1, U_2, \ldots, U_{N_U}\}$, in which $N_U$ represents the number of UAVs;

wherein the first row in the chromosome is a random full permutation of the target points, the second row is a corresponding groundspeed course angle randomly selected for each target point based on the dispersion of course angle of the UAVs, and the third row is a corresponding UAV randomly selected for each target point based on the set of UAVs, it is ensured that all the UAVs in the set are selected at least once.

Optionally, the second processing module is further configured to divide the Dubins flight path corresponding to each chromosome into a plurality of path segments based on the order in which the target points comprised in the flight path are visited, and to perform a first step and a second step:

the first step comprising:

calculating the flight time of a UAV $U_i$ that flies from a target point $T_j$ at a groundspeed course angle $\beta_{gj}$ to a target point $T_k$ at a groundspeed course angle $\beta_{gk}$ according to the following formula:

$$t^i_{(T_j,\beta_{gj},T_k,\beta_{gk})} = \sum_{\theta=\beta_{gj}}^{\beta_{gk}} \int_\theta^{\theta+\Delta\theta} \frac{r_{min}}{V_g^i} d\theta, \forall T_j, T_k \in T, \forall U_i \in U$$

wherein $U_i$ represents the UAV performing the task, U represents the set of UAVs, $T_j$ represents the starting point, $\beta_{gj}$ represents the course angle of the UAV at the starting point, $T_k$ represents the ending point, $\beta_{gk}$ represents the course angle of the UAV at the ending point, T represents the set of target points, $r_{min}$ represents the minimum turning radius of the UAV, and $V_g^i$ represents the ground speed of the UAV $U_i$, $\Delta\theta$ is the angular rotation of the UAV $U_i$ and $V_g(\theta)$ is the ground speed of UAV $U_i$ when the groundspeed course angle is $\theta$;

obtaining ground speed of the UAV according to the following formula:

$$\begin{pmatrix} \cos\beta_g^i \\ \sin\beta_g^i \end{pmatrix} \cdot V_g^i = \begin{pmatrix} \cos\beta_a^i & \cos\beta_w^i \\ \sin\beta_a^i & \sin\beta_w^i \end{pmatrix} \begin{pmatrix} V_a^i \\ V_w^i \end{pmatrix}$$

wherein $V_a^i$ represents the airspeed, $\beta_a^i$ represents the airspeed course angle, $V_g^i$ represents the groundspeed, $\beta_g^i$ represents the groundspeed course angle, $V_w^i$ represents the wind speed, and $\beta_w^i$ represents the wind direction;

the second step comprising:

obtaining the flight time according to the MUAV-VS-DVRP model:

$$J = \max\left\{\sum_{j=0}^{N_T}\sum_{k=0}^{N_T} X_{(T_j,\beta_{gj},T_k,\beta_{gk})}^i t_{(T_j,\beta_{gj},T_k,\beta_{gk})}^i, i = 1, K, N_U\right\}$$

wherein the constraints are:

$$\sum_{i=1}^{N_U}\sum_{k=1}^{N_T}\sum_{gk=0}^{N_g-1}\sum_{gj=0}^{N_g-1} X_{(T_j,\beta_{gj},T_k,\beta_{gk})}^i = 1, \forall T_j \in T$$

$$\sum_{k=1}^{N_T}\sum_{gk=0}^{N_g-1}\sum_{i=1}^{N_U} X_{(T_0,\beta_{g0},T_k,\beta_{gk})}^i = \sum_{k=1}^{N_T}\sum_{gk=0}^{N_g-1}\sum_{i=1}^{N_U} X_{(T_k,\beta_{gk},T_0,\beta_{g0})}^i = N_U$$

$$\sum_{i=1}^{N_U}\sum_{j=0}^{N_T}\sum_{gj=0}^{N_g-1}\sum_{k=0}^{N_T}\sum_{gk=0}^{N_g-1} X_{(T_j,\beta_{gj},T_k,\beta_{gk})}^i = N_T + N_U$$

wherein $\beta_{gj}$, and $\beta_{gk}$ represent the course angle of UAV $U_i$ at two target points $T_j$ and $T_k$ respectively, $t_{(T_j,\beta_{gj},T_k,\beta_{gk})}^i$ represents the flight time of UAV $U_i$ flying from a target point $T_j$ at a groundspeed course angle $\beta_{gj}$ to a target point $T_k$ at a groundspeed course angle $\beta_{gk}$, $X_{(T_j,\beta_{gj},T_k,\beta_{gk})}^i$ is a binary decision variable that is equal to 1 if the UAV $U_i$ flies from a target point $T_j$ at a groundspeed course angle $\beta_{gj}$ to a target point $T_k$ at a groundspeed course angle $\beta_{gk}$, otherwise equal to 0, $N_T$ represents the number of target points, and $N_g$ represents the dispersion of groundspeed course angle of the UAV.

Optionally, the third processing module is further configured to perform the following steps:

a first step of generating an initial solution and an initial population of a predetermined size using the coding scheme, and calculating fitness of each chromosome in the population based on the time taken by the chromosome to complete the task, wherein the initial solution is the generated first chromosome;

a second step of subjecting two individuals (A, B) selected from the parent population by roulette wheel selection method to crossover. The rule of crossover comprises: step 1, randomly selecting a crossover position in the individual A, then finding a gene in the individual B that is the same as the first row at the crossover position of the individual A, replacing the genes at the crossover position in the chromosomes A and B to obtain new chromosomes C and D, and then skipping to step 2; step 2, determining whether the chromosomes C and D satisfy constraints of the MUAV-VS-DVRP model, if so, skipping to step 3, otherwise, skipping to step 4; step 3, replacing the chromosomes A and B in the population with the chromosomes C and D and skipping to step 7; step 4, performing constraint check for the chromosomes that do not satisfy the constraints, that is, when it is determined that the number of UAVs in the chromosomes A and B does not satisfy the constraints, randomly selecting a gene locus in the chromosome that does not satisfy the constraints and determining whether there exists two or more UAV codes at this gene locus, if yes, skipping to step 5, otherwise skipping to step 6; step 5, placing the missing UAV code into the gene locus and skipping to step 7; step 6, re-selecting a gene locus to generate a chromosome satisfying the constraints to replace the chromosomes A and B, and then skipping to step 7; step 7, iteratively updating the population of the first step to obtain a new offspring population;

a third step of subjecting a chromosome selected from the population of the second step by roulette wheel selection method to mutation, the mutation including at least one of target point mutation of the first row of the chromosome, groundspeed course angle mutation of the second row of the chromosome, and UAV mutation of the third row of the chromosome;

the mutation process of the entire chromosome comprises the following steps: step 1, if mutation has occurred to the order of the first row of the chromosome, randomly selecting two gene locus of the current chromosome and exchanging target point codes at the corresponding gene locus, and then skipping to step 2; step 2, determining whether mutation has occurred to the second row and the locus of mutation and, if the mutation has occurred, randomly generating a value different from the groundspeed course angle code of the UAV at the current locus to replace the initial code, and then skipping to step 3; step 3, determining whether mutation has occurred to the third row and the locus of mutation and, if the mutation has occurred, skipping to step 4, otherwise skipping to step 8; step 4, randomly generating a value different from the UAV code at the current locus to replace the initial code, and after the mutation, determining whether the resulting chromosome satisfies the constraints of the MUAV-VS-DVRP model, if so, skipping to step 8, otherwise skipping to step 5; step 5, performing constraint check for the chromosome that does not satisfy the constraints such that when it is determined that the number of UAVs in the chromosome does not satisfy the constraints, randomly selecting a gene locus in the chromosome that does not satisfy the constraints and determining whether there exists two or more UAV codes at said gene locus, if yes, skipping to step 6, otherwise skipping to step 7; step 6, placing the missing UAV code into the gene locus and skipping to step 8; step 7, re-selecting a gene locus to generate a chromosome satisfying the constraints to replace the chromosomes in the population and skipping to step 8; step 8, replacing the chromosome in the population with the resulting chromosome and iteratively updating the population of the second step to obtain a new offspring population;

a fourth step of calculating the fitness of the offspring population and selecting the optimal solution from all the solutions in this iteration; and a fifth step of determining whether the current number of iterations reaches a preset value; if no, combining the offspring population and the parent population in the third step according to a certain proportion to form a new parent population and returning to the second step; and if yes, ending the iteration and taking the ultimate optimal solution as the UAV task assignment and path planning result.

As described above, the method and apparatus for joint optimization of multi-UAV task assignment and path planning provided by the embodiments of the present invention obtain actual flight status of the UAVs in the wind field by analyzing motion parameters of the wind field and the UAVs and then plan the flight path based on the actual flight status. As compared with the prior art which assumes that the UAV speed is constant, the method and apparatus according to the present invention make it possible to precisely calculate the flight time of UAVs on all possible flight paths based on the state of the wind field in the uncertain environment, whereby the optimal flight path may be selected.

BRIEF DESCRIPTION OF DRAWINGS

The features and advantages of the present invention will be more clearly understood by reference to the following drawings, which are intended to be illustrative and not to be construed as limiting the invention in any way. Among the drawings:

FIGS. 4a-4c illustrate an operator in the genetic algorithm according to an embodiment of the present invention;

DETAILED DESCRIPTION OF THE EMBODIMENTS

In order to make objects, technical details and advantages of the embodiments of the invention apparent, technical solutions according to the embodiments of the present invention will be described clearly and completely as below in conjunction with the accompanying drawings of embodiments of the present invention. Obviously, the described embodiments are only parts of the embodiments of the present invention, but not all embodiments of the present invention. All other embodiments obtained by a person of ordinary skill in the art based on the embodiments of the present invention without creative efforts shall fall within the protection scope of the present invention.

Figure 1:
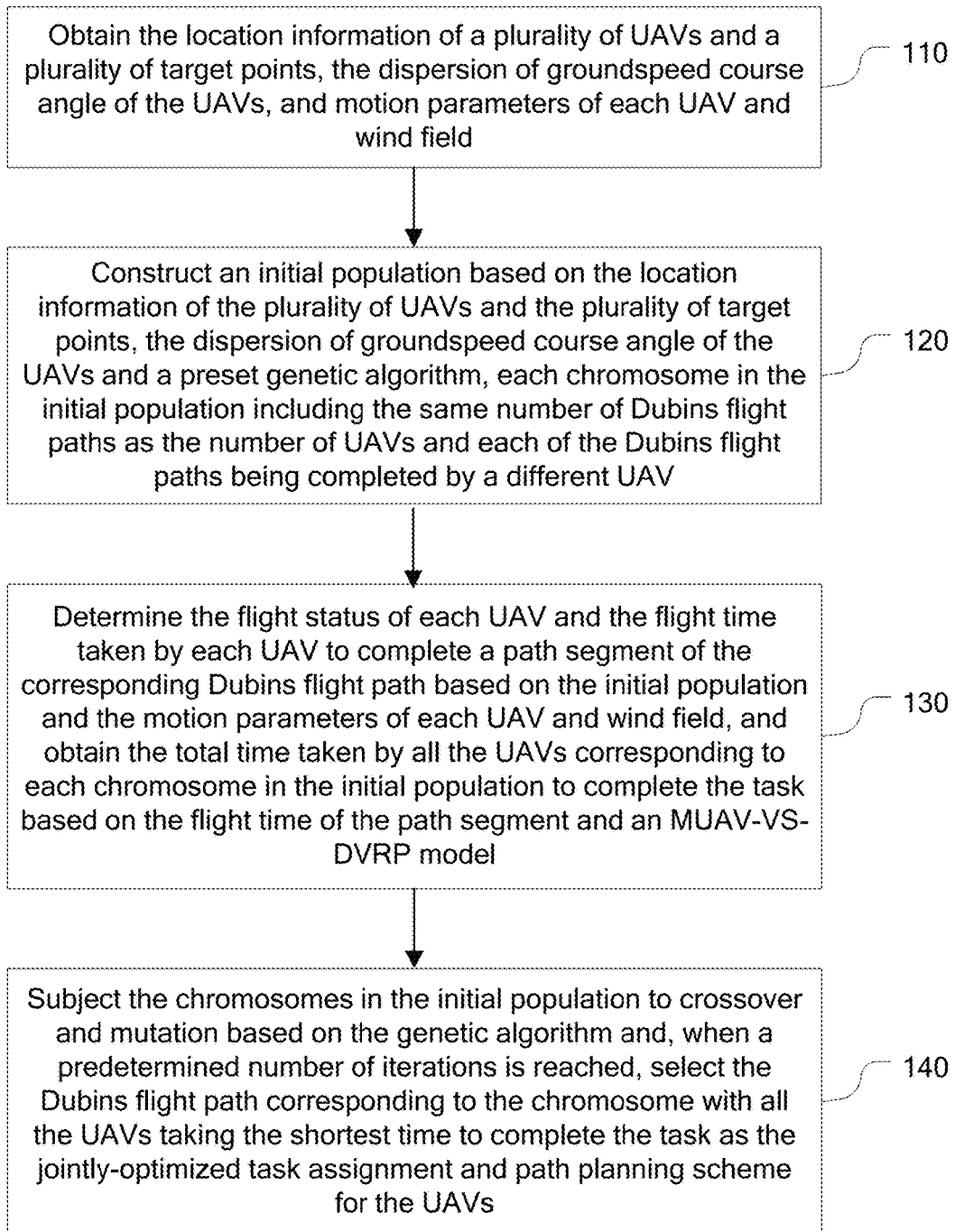
FIG. 1 is a flow chart of multi-UAV task assignment and path planning according to an embodiment of the present invention.

FIG. 1 illustrates a flow chart of a method for joint optimization of multi-UAV task assignment and path planning according to an embodiment of the present invention. As shown in FIG. 1, the method may be carried out by a processor and comprises the following steps:

a step 110 of obtaining the location information of a plurality of UAVs and a plurality of target points, the dispersion of groundspeed course angle of the UAVs, and motion parameters of each UAV and wind field;

It should be noted that before performing task assignment and path planning, a technician may set or measure the location information of the UAVs and target points according to the actual situation, and then input the information into the processor; and the dispersion of the groundspeed course angle may be configured according to actual needs.

In addition, the motion parameters of the UAVs may be set by the technician according to actual flight needs, and the motion parameters of the wind field may be measured by the technician or set according to actual conditions.

a step 120 of constructing an initial population based on the location information of the plurality of UAVs and the plurality of target points, the dispersion of groundspeed course angle of the UAVs and a preset genetic algorithm, each chromosome in the initial population including the same number of Dubins flight paths as the number of UAVs and each of the Dubins flight paths being completed by a different UAV;

It is not hard to understand that the UAV will inevitably be affected by the wind field when flying in the wind field. Examples of influencing factors include wind direction and wind speed of the wind field. Therefore, in order to obtain the accurate actual flight status of UAV, in this embodiment the actual flight status of UAV is calculated based on the motion parameters of the UAV itself and the motion parameters of the wind field, in order to provide an accurate data foundation for subsequent path planning.

In detail, the motion parameters of the UAV include airspeed, and the motion parameters of the wind field include wind speed. The groundspeed of the UAV is obtained based on the airspeed of the UAV and the wind speed of the wind field.

In addition, it would be appreciated that there may be an infinite number of flight paths between two points in the absence of constraints. Therefore, in order to reduce the amount of calculation, in the embodiments of the present invention, certain constraints are preset in the premise of not affecting the route planning as much as possible, for example, restraining the UAV course angle, flight altitude and etc. And then, an initial population with a limited number of chromosomes may be constructed with a preset genetic algorithm.

It would be appreciated that there are several ways to build a flight path. Here, the Dubins car model is used.

a step 130 of determining the flight status of each UAV and the flight time taken by each UAV to complete a path segment of the corresponding Dubins flight path based on the initial population and the motion parameters of each UAV and wind field, and obtaining the total time taken by all the UAVs corresponding to each chromosome in the initial population to complete the task based on the flight time of the path segment and an MUAV-VS-DVRP model; and a step 140 of subjecting the chromosomes in the initial population to crossover and mutation based on the genetic algorithm and, when a predetermined number of iterations is reached, selecting the Dubins flight path corresponding to the chromosome with all the UAVs taking the shortest time to complete the task as the jointly-optimized task assignment and path planning scheme for the UAVs.

It would be appreciated that each iteration of crossover or mutation may result in the appearance of a new individual. Then flight time of the new chromosome is calculated according to step 130. Therefore, each chromosome corresponds to a flight time.

As can be seen, the present embodiment obtains the actual flight status of the UAVs in the wind field by analyzing motion parameters of the wind field and the UAVs and then plans the flight path based on the actual flight status. As compared with the prior art which assumes that the UAV speed is constant, the present embodiment achieves better flight path planning with the actual flight environment taken into consideration, making it possible to precisely calculate the flight time of UAVs on all possible flight paths, whereby the optimal flight path may be selected.

The steps in the embodiment of the present invention are described in detail below.

First, the step 120 comprises:

performing chromosome coding according to coding scheme of the preset genetic algorithm to generate an initial population of a predetermined size; the chromosome consisting of target point information, UAV groundspeed course angle information and UAV information; wherein the target point belongs to a set $T=\{T_0, T_1, T_2, \ldots, T_{N_T}\}$, in which $T_0$ represents a starting point of the UAVs, the UAV groundspeed course angle belongs to a set $$H = \left\{\beta_{gi}; \beta_{gi} = \frac{2\pi i}{N_g}, i = 0, 1, \ldots, N_g - 1\right\},$$

in which $N_g$ represents the dispersion of groundspeed course angle of the UAVs, and the UAV belongs to a set $U=\{U_1, U_2, \ldots, U_{N_U}\}$, in which $N_U$ represents the number of UAVs;

wherein the first row in the chromosome is a random full permutation of the target points, the second row is a corresponding groundspeed course angle randomly selected for each target point based on the dispersion of course angle of the UAVs, and the third row is a corresponding UAV randomly selected for each target point based on the set of UAVs, it is ensured that all the UAVs in the set are selected at least once.

It should be noted that the course angle of the UAV is 360°. In order to reduce the amount of data to be processed by the processor and improve the efficiency of the path planning, the course angle should be such that the course angle for a UAV to reach a certain target point must be an multiple of 10°, such as 10°, 20°, . . . 360°.

Figure 2:
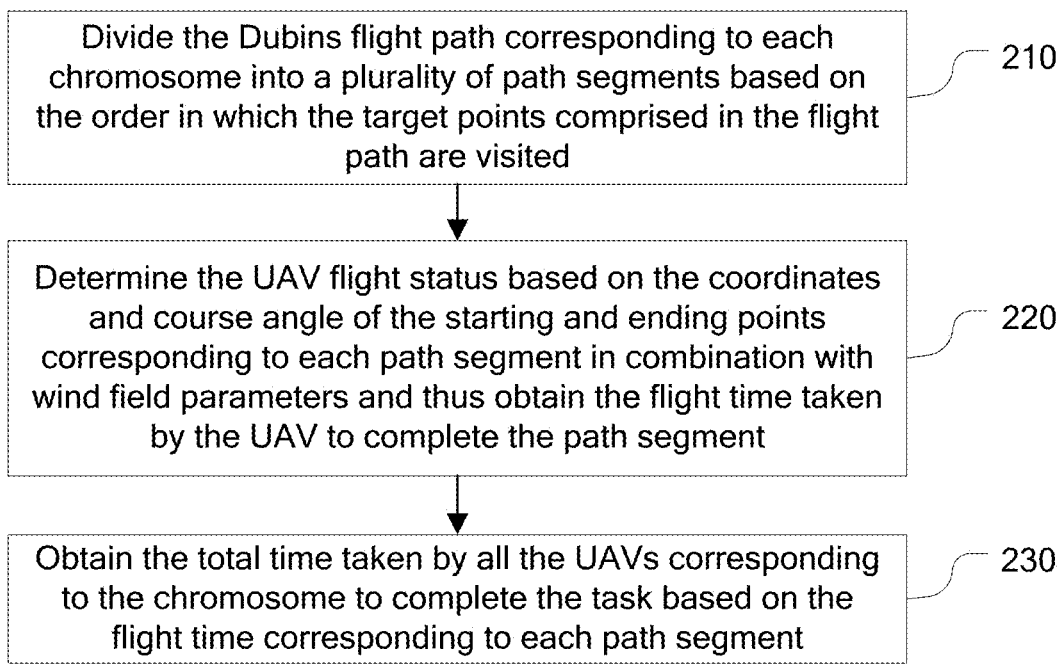
FIG. 2 is a flow chart of calculating the flight time of a Dubins flight path according to an embodiment of the present invention.

As shown in FIG. 2, the step 130 comprises:

a step 210 of dividing the Dubins flight path corresponding to each chromosome into a plurality of path segments based on the order in which the target points comprised in the flight path are visited;

a step 220 of determining the UAV flight status based on the coordinates and course angle of the starting and ending points corresponding to each path segment in combination with wind field parameters and thus obtaining the flight time taken by the UAV to complete the path segment; and a step 230 of obtaining the total time taken by all the UAVs corresponding to the chromosome to complete the task based on the flight time corresponding to each path segment.

It should be noted that after constructing all Dubins flight paths corresponding to one chromosome, the processor divides a Dubins flight path into several segments according to the change of angle, and then calculates the flight time for each segment of the flight path using the preset calculation model based on the coordinates of the starting and ending points of each segment and the course angle of the UAV arriving at the starting and ending points respectively, whereby the flight time can be obtained for the particular Dubins flight path. Similarly, the flight time of all Dubins flight paths corresponding to each chromosome may be calculated.

The step 220 comprises:

calculating the flight time of a UAV $U_i$ that flies from a target point $T_j$ at a groundspeed course angle $\beta_{gj}$ to a target point $T_k$ at a groundspeed course angle $\beta_{gk}$ according to the following formula:

$$t^i_{(T_j,\beta_{gj},T_k,\beta_{gk})} = \sum_{\theta=\beta_{gj}}^{\beta_{gk}} \int_\theta^{\theta+\Delta\theta} \frac{r_{min}}{V_g^i} d\theta, \forall U_i \in U, \forall T_j, T_k \in T$$

wherein $U_i$ represents the UAV performing the task, U represents the set of UAVs, $T_j$ represents the starting point, $\beta_{gj}$ represents the course angle of the UAV at the starting point, $T_k$ represents the ending point, $\beta_{gk}$ represents the course angle of the UAV at the ending point, T represents the set of target points, $r_{min}$ represents the minimum turning radius of the UAV, and $V_g^i$ represents the ground speed of the UAV $U_i$, $\Delta\theta$ is the angular rotation of the UAV $U_i$ and $V_g(\theta)$ is the ground speed of UAV $U_i$ when the groundspeed course angle is $\theta$;

obtaining ground speed of the UAV according to the following formula:

$$\begin{pmatrix} \cos\beta_g^i \\ \sin\beta_g^i \end{pmatrix} \cdot V_g^i = \begin{pmatrix} \cos\beta_a^i & \cos\beta_w^i \\ \sin\beta_a^i & \sin\beta_w^i \end{pmatrix} \begin{pmatrix} V_a^i \\ V_w^i \end{pmatrix}$$

wherein $V_a^i$ represents the airspeed, $\beta_a^i$ represents the airspeed course angle, $V_g^i$ represents the groundspeed, $\beta_g^i$ represents the groundspeed course angle, $V_w^i$ represents the wind speed, and $\beta_w^i$ represents the wind direction.

The time for the UAV to complete the task may be obtained according to the MUAV-VS-DVRP model:

$$J = \max\left\{\sum_{j=0}^{N_T}\sum_{k=0}^{N_T} X^i_{(T_j,\beta_{gj},T_k,\beta_{gk})} t^i_{(T_j,\beta_{gj},T_k,\beta_{gk})}, i = 1, K, N_U\right\}$$

wherein the constraints are:

$$\sum_{i=1}^{N_U}\sum_{k=1}^{N_T}\sum_{gk=0}^{N_g-1}\sum_{gj=0}^{N_g-1} X^i_{(T_j,\beta_{gj},T_k,\beta_{gk})} = 1, \forall T_j \in T$$

$$\sum_{k=1}^{N_T}\sum_{gk=0}^{N_g-1}\sum_{i=1}^{N_U} X^i_{(T_0,\beta_{g0},T_k,\beta_{gk})} = \sum_{k=1}^{N_T}\sum_{gk=0}^{N_g-1}\sum_{i=1}^{N_U} X^i_{(T_k,\beta_{gk},T_0,\beta_{g0})} = N_U$$

$$\sum_{i=1}^{N_U}\sum_{j=0}^{N_T}\sum_{gk=0}^{N_g-1}\sum_{k=0}^{N_T}\sum_{gk=0}^{N_g-1} X^i_{(T_j,\beta_{gj},T_k,\beta_{gk})} = N_T + N_U$$

wherein $\beta_{gj}$ and $\beta_{gk}$ represent the course angle of UAV $U_i$ at two target points $T_j$ and $T_k$ respectively, $t^i_{(T_j,\beta_{gj},T_k,\beta_{gk})}$ represents the flight time of UAV $U_i$ flying from a target point $T_j$ at a groundspeed course angle $\beta_{gj}$ to a target point $T_k$ at a groundspeed course angle $\beta_{gk}$, $X_{(T_j,\beta_{gj},T_k,\beta_{gk})}^i$ is a binary decision variable that is equal to 1 if the UAV $U_i$ flies from a target point $T_j$ at a groundspeed course angle $\beta_{gj}$ to a target point $T_k$ at a groundspeed course angle $\beta_{gk}$, otherwise equal to 0, $N_T$ represents the number of target points, and $N_g$ represents the dispersion of groundspeed course angle of the UAV.

The step 140 comprises:

a first step of generating an initial solution and an initial population of a predetermined size using the coding scheme, and calculating fitness of each chromosome in the population based on the time taken by the chromosome to complete the task, wherein the initial solution is the generated first chromosome;

a second step of subjecting two individuals (A, B) selected from the parent population by roulette wheel selection method to crossover. The rule of crossover comprises: step 1, randomly selecting a crossover position in the individual A, then finding a gene in the individual B that is the same as the first row at the crossover position of the individual A, replacing the genes at the crossover position in the chromosomes A and B to obtain new chromosomes C and D, and then skipping to step 2; step 2, determining whether the chromosomes C and D satisfy constraints of the MUAV-VS-DVRP model, if so, skipping to step 3, otherwise, skipping to step 4; step 3, replacing the chromosomes A and B in the population with the chromosomes C and D and skipping to step 7; step 4, performing constraint check for the chromosomes that do not satisfy the constraints, that is, when it is determined that the number of UAVs in the chromosomes A and B does not satisfy the constraints, randomly selecting a gene locus in the chromosome that does not satisfy the constraints and determining whether there exists two or more UAV codes at this gene locus, if yes, skipping to step 5, otherwise skipping to step 6; step 5, placing the missing UAV code into the gene locus and skipping to step 7; step 6, re-selecting a gene locus to generate a chromosome satisfying the constraints to replace the chromosomes A and B, and then skipping to step 7; step 7, iteratively updating the population of the first step to obtain a new offspring population;

a third step of subjecting a chromosome selected from the population of the second step by roulette wheel selection method to mutation, the mutation including at least one of target point mutation of the first row of the chromosome, groundspeed course angle mutation of the second row of the chromosome, and UAV mutation of the third row of the chromosome;

the mutation process of the entire chromosome comprises the following steps: step 1, if mutation has occurred to the order of the first row of the chromosome, randomly selecting two gene locus of the current chromosome and exchanging target point codes at the corresponding gene locus, and then skipping to step 2; step 2, determining whether mutation has occurred to the second row and the locus of mutation and, if the mutation has occurred, randomly generating a value different from the groundspeed course angle code of the UAV at the current locus to replace the initial code, and then skipping to step 3; step 3, determining whether mutation has occurred to the third row and the locus of mutation and, if the mutation has occurred, skipping to step 4, otherwise skipping to step 8; step 4, randomly generating a value different from the UAV code at the current locus to replace the initial code, and after the mutation, determining whether the resulting chromosome satisfies the constraints of the MUAV-VS-DVRP model, if so, skipping to step 8, otherwise skipping to step 5; step 5, performing constraint check for the chromosome that does not satisfy the constraints such that when it is determined that the number of UAVs in the chromosome does not satisfy the constraints, randomly selecting a gene locus in the chromosome that does not satisfy the constraints and determining whether there exists two or more UAV codes at said gene locus, if yes, skipping to step 6, otherwise skipping to step 7; step 6, placing the missing UAV code into the gene locus and skipping to step 8; step 7, re-selecting a gene locus to generate a chromosome satisfying the constraints to replace the chromosomes in the population and skipping to step 8; step 8, replacing the chromosome in the population with the resulting chromosome and iteratively updating the population of the second step to obtain a new offspring population;

a fourth step of calculating the fitness of the offspring population and selecting the optimal solution from all the solutions in this iteration; and a fifth step of determining whether the current number of iterations reaches a preset value; if no, combining the offspring population and the parent population in the third step according to a certain proportion to form a new parent population and returning to the second step; and if yes, ending the iteration and taking the ultimate optimal solution as the UAV task assignment and path planning result.

Figure 3:
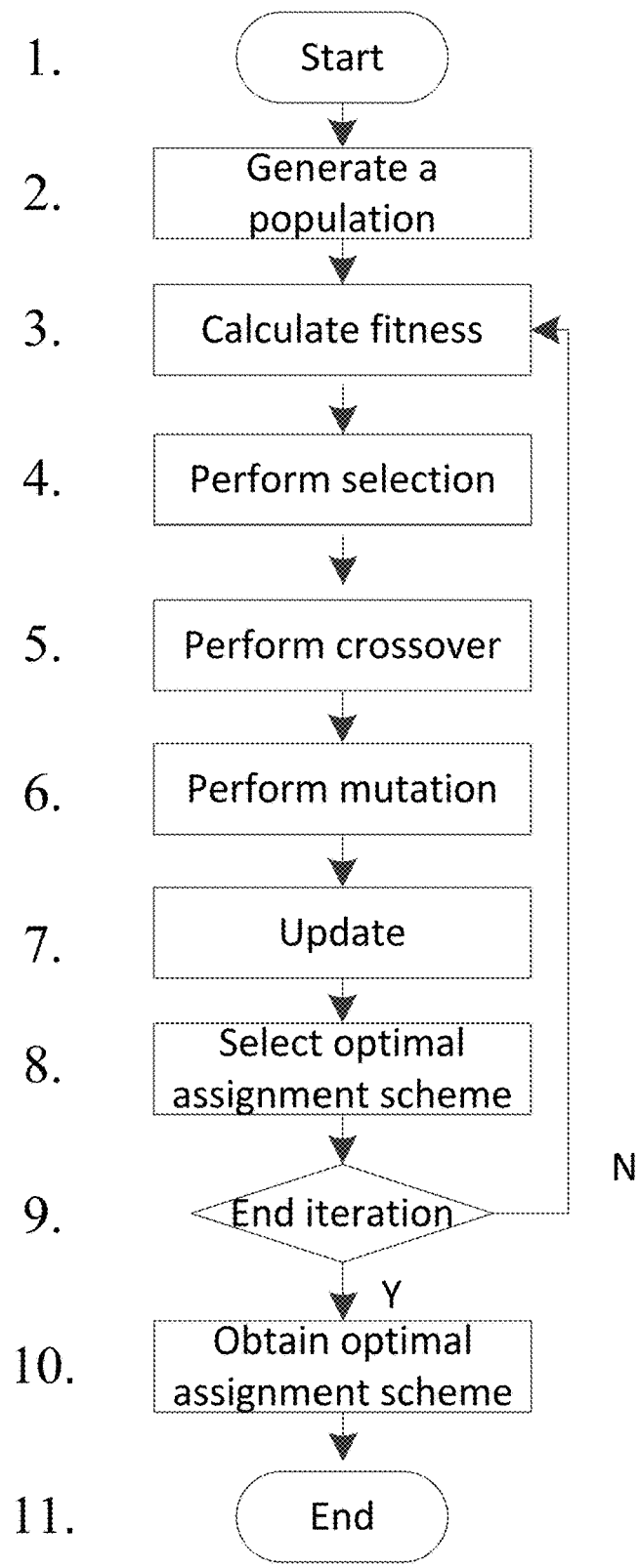
FIG. 3 is a flow chart of a genetic algorithm according to an embodiment of the present invention.

The principle of the genetic algorithm adopted by the present invention will be described in detail below with reference to FIG. 3:

1. Start;

2. Generating a population comprising a specified number of chromosomes based on the technician's settings, for example, the specified number may be 100;

Wherein, each chromosome corresponds to the Dubins flight path in step 130 in the corresponding embodiment of FIG. 1.

It should be noted that chromosome coding represents a feasible solution to the problem. A feasible solution to the problem of MUAV-VS-DVRP consists of three parts: the order of the UAV visiting the target points, the course angle of the UAV visiting the target point, and the UAV code. Similarly, the code of the chromosome also consists of three parts: the target point code, the course angle code, and the UAV code. The target point code belongs to the set $\{T_1, T_2, \ldots, T_{N_T}\}$, the course angle code belongs to the set $$H = \left\{\beta_{gi}; \beta_{gi} = \frac{2\pi i}{N_g}, i = 0, 1, \ldots, N_g - 1\right\},$$

and the UAV code belongs to the set $U = \{U_1, U_2, \ldots, U_{N_U}\}$, wherein $N_U$ represents the number of UAVs.

As shown in FIG. 4a, chromosome A represents a feasible solution for two UAVs to visit three target points in a stable wind field, that is, the UAV No. 1 departs from the starting point S (0, 0) and returns after visiting the target point 3, the UAV No. 2 departs from the starting point S (0, 0) and returns after visiting the target points 1 and 2 successively. The second row represents the code of the course angle when the UAV visits the corresponding target point, that is, i, and the corresponding course angle $\beta_{gi}$ may be obtained through decoding of the code i.

3. Calculating the fitness of each chromosome;

It should be noted that the calculation method corresponding to step 140 in the embodiment of FIG. 1 is adopted to calculate the time taken by all the UAVs corresponding to the chromosome to complete the task, and calculate the fitness of the chromosome based on the calculated task completion time. For example, the time taken to complete the task may be inversely proportional to the fitness.

It would be appreciated that the fitness is calculated after a population of a predetermined size is generated according to the coding scheme in the above second step (i.e., the step of generating a population comprising a specified number of chromosomes). The fitness calculation in the present invention is based on the objective function and is calculated as follows:

$$J' = \frac{1}{J}$$

4. Selection;

Selection is performed by the roulette wheel selection method based on J'.

5. Crossover;

By crossover of the parent chromosomes, it is possible to inherit good genes from the parents to obtain better offspring. On the MUAV-VS-DVRP problem, the present disclosure designs a new partial mapping crossover method for the current coding scheme. That is, a gene locus for crossover is randomly generated in the parent chromosome A, and then a gene locus in the Parent B corresponding to the same target point is found, two intermediate offspring chromosomes A and B are generated after crossover and the UAV codes of the intermediate offspring chromosomes are subject to collision check. That is, in the case that there are two UAVs performing the task, if the UAV codes of any of the intermediate offspring chromosomes have only one value, the UAV code corresponding to the gene locus before the crossover and the UAV code at a random position of the current chromosome are exchanged, whereby two feasible offspring chromosomes may be obtained.

As shown in FIG. 4b, two parent chromosomes Parent A and Parent B are present. A gene locus (i.e., 3) for crossover is randomly generated in the Parent A, then a gene locus in the Parent B corresponding to the same target point is found, two intermediate offspring chromosomes Proto-Child A and Proto-Child B are generated after crossover. It can be seen that all UAV codes in Proto-Child B are 2, meaning that the all the current target points are visited by UAV No. 2, which does not meet the requirement that the target points need to be visited by multiple UAVs. In this case, a gene locus (i.e., 2) for UAV code crossover is randomly generated, and the UAV code corresponding to the gene locus before the crossover and the current UAV code are exchanged to obtain two feasible offspring chromosomes OffSpring A and OffSpring B.

6. Mutation;

The purpose of mutation is to prevent the genetic algorithm from getting into local optimum. There are three cases of chromosome mutation in the genetic algorithm for solving the DVS-VRP model: target point code mutation, course angle code mutation and UAV code mutation. Depending on the mutation probability, the chromosome may be subject to multiple mutations, or no mutation. The target point code mutation adopts two-gene locus mutation. In other words, two gene locus for mutation are randomly generated in the first row of the chromosome and the values at these two gene locus are exchanged. By doing so, the constraint that each target point in the model can only be visited once is satisfied and the feasibility of the offspring chromosome is ensured.

Mutation of both the course angle code and UAV code adopts uniform mutation. Note that the UAV code mutation has the potential of producing unfeasible chromosomes, therefore, mutation operator check is required after the UAV code mutation.

As shown in FIG. 4c, a parent chromosome Parent A is present. The Parent A is subject to target point mutation, course angle mutation and UAV mutation, respectively. It is necessary to determine whether two of the three types of the mutation have already occurred before performing the mutation. When it is determined that the target point mutation has occurred, the gene locus for mutation (in this case, 1 and 3) are randomly selected and then the target values at the selected gene locus are exchanged, whereby a new order for visiting the target points is obtained; when it is determined that the course angle mutation has occurred, the gene locus for mutation (in this case, 2) are randomly selected and then a course angle different from the current course angle is generated to replace the current one, whereby a new course angle state for the UAV to visit the target point is obtained; when it is determined that the UAV mutation has occurred, the gene locus for mutation (in this case, 2) are randomly selected and then a new UAV different from the current UAV is generated to replace the current one, whereby a new chromosome is obtained. However, when the gene locus selected for UAV mutation is 3, all UAV codes in the chromosome obtained after the mutation are 1, which does not meet the constraints. In this case, a gene locus is randomly selected in the resulting chromosome and the UAV code at the selected gene locus is mutated to a missing value in the current chromosome, whereby a chromosome satisfying the constraints is obtained.

7. Update;
8. Selecting the optimum assignment scheme;
9. Determining whether to end the iteration;
10. Obtaining the optimum assignment scheme;
11. End.

It should be noted that the above steps correspond to some steps in the corresponding embodiment in FIG. 1, so the similarities are not described herein again. For details, please refer to the related content in the embodiment corresponding to FIG. 1.

The design principle of the present invention will be described in detail below in conjunction with the above genetic algorithm.

The first step is to model the wind field. In order to avoid the problem being too complicated, the present invention uses a fixed wind field in a region to model the wind field, that is, the wind speed and direction in the wind field are constant within a prescribed area.

The wind field status of a known area can be expressed as:

$$\dot{V}_w = (V_w, \beta_w) \quad (2)$$

wherein $V_w$ represents the wind speed and $\beta_w$ represents the wind direction.

Figure 5:
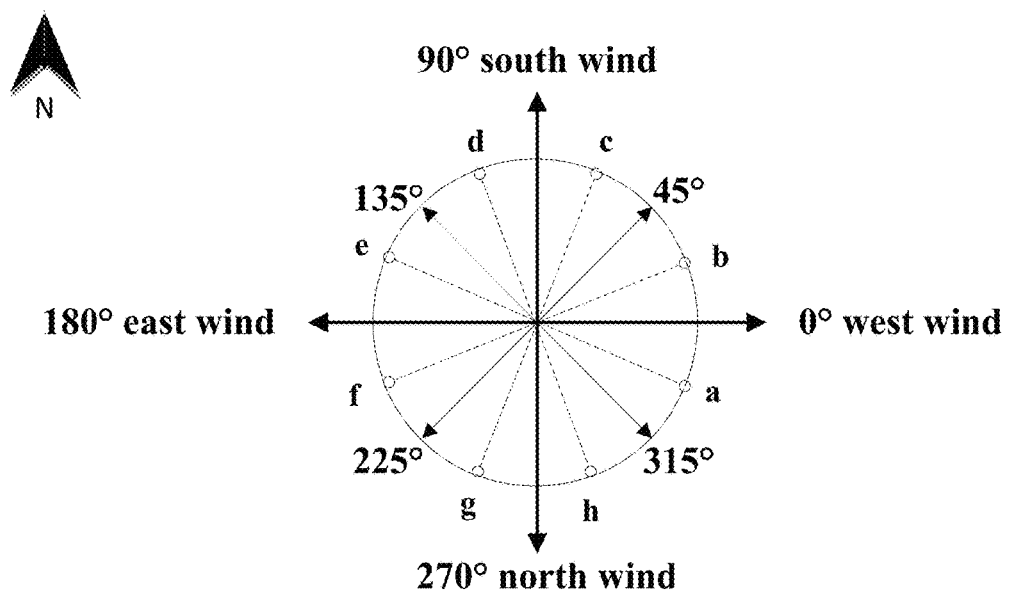
FIG. 5 illustrate wind directions according to an embodiment of the present invention.

Wind speed $V_w$ is defined as distance the wind moves relative to the ground in the unit time, in units of m/s; wind direction $\beta_w$ is defined as the direction from which the wind blows, in general the measurement unit of the wind direction is expressed in terms of direction. For example, it is generally expressed in 16 directions on the land and more than 36 directions on the sea. While the measurement unit of the wind direction is expressed in terms of angles at high altitude, that is, the circumference is divided into 360 degrees. It is specified in this document that the west wind (W) is indicated by 0 degree (namely, 360 degrees), the south wind (S) is indicated by 90 degrees, the east wind (E)

is indicated by 180 degrees and the north wind (N) is indicated by 270 degrees, as shown in FIG. 5.

The second step is configure the UAV.

The UAV is represented by U, and the configuration of fixed-wing UAV in the air is defined as follows:

$$q=(x,y,\psi) \tag{4}$$

wherein, $$x=V_g \cos\psi \tag{5}$$

$$y=V_g \sin\psi \tag{6}$$

$$\beta_u = c\Omega_{max} \tag{7}$$

wherein x and y are the coordinates of a UAV in a Cartesian inertial reference system; $V_g$ represents the ground speed of the UAV; $\beta_u$ represents the angular velocity of the UAV; $|c| \leq 1$, indicating the angle command of the UAV; and $\Omega_{max}$ represents the maximum rotational angular velocity of the UAV.

It should be noted that:

$$\Omega_{max} = \frac{V_g}{r_{min}} \tag{8}$$

wherein $r_{min}$ represents the minimum turning radius of the UAV, $V_g$ represents the ground speed of the fixed-wing UAV. Therefore, in the joint optimization of multi-UAV task assignment and path planning under the influence of the wind, the maximum rotational angular velocity of the UAV needs to satisfy the following conditions:

$$|\beta_u| = \frac{V_g}{r} \leq \frac{V_g}{r_{min}} \tag{9}$$

wherein the value of $r_{min}$ is fixed.

In order to simplify the problem, this document proposes the following assumptions about the motion constraints that the UAV needs to satisfy during the task:

(1) the UAV minimum turning radius, $r_{min}$, is unchanged;

(2) the UAV flies at a fixed altitude;

(3) According to the flight envelope of the UAV, the UAV has upper and lower bounds for its flight speed at a fixed altitude and fixed load namely, $V_a \subset [V_{a\_min}, V_{a\_max}]$, wherein $V_{a\_min}$ and $V_{a\_max}$ represent the minimum and maximum values of the airspeed of the UAV at a certain altitude; and (4) the UAV departs from the starting point and returns to the starting point after completing the task.

The third step is to calculate the actual flight status of the UAV.

Figure 6:
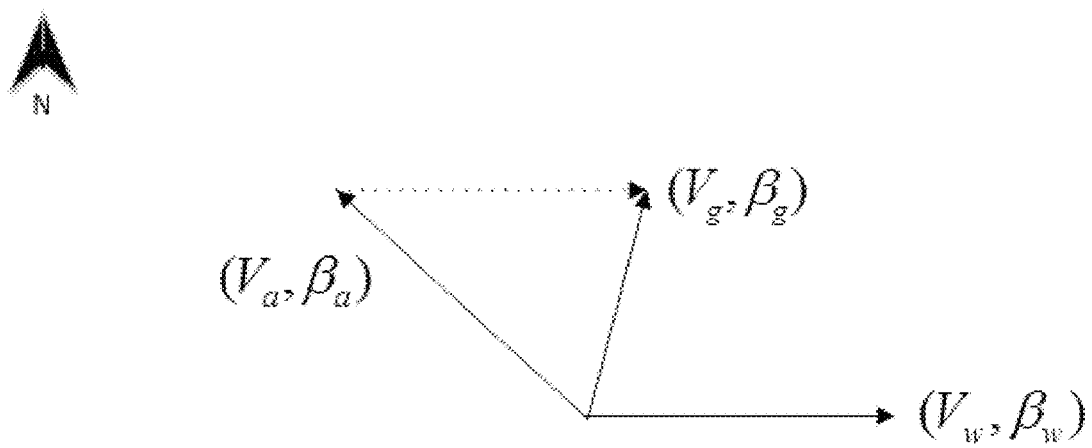
FIG. 6 illustrates a speed vector relation according to an embodiment of the present invention.

The actual speed of the UAV considering the wind effect is defined as the groundspeed of the UAV, namely, $V_g$, in this case the course angle of the UAV is $\beta_g$, the groundspeed vector of the UAV is $V_g = (V_g, \beta_g)$; the theoretical speed of the UAV without considering the wind effect is defined as the airspeed of the UAV, namely, $V_a$, in this case the course angle of the UAV is $\beta_a$, the airspeed vector of the UAV is $V_a = (V_a, \beta_a)$. The vector relation among the UAV airspeed $V_a$, groundspeed $V_g$ and wind speed $V_w$ in the wind field is shown in FIG. 6.

The relationship between above speeds and angles is as follows:

$$\begin{pmatrix} \cos\beta_g \\ \sin\beta_g \end{pmatrix} \cdot V_g = \begin{pmatrix} \cos\beta_a & \cos\beta_w \\ \sin\beta_a & \cos\beta_w \end{pmatrix} \begin{pmatrix} V_a \\ V_w \end{pmatrix} \tag{10}$$

In the case that there is no wind, $V_a = V_g$, and $\beta_a = \beta_g$, namely, the UAV airspeed is equal to the groundspeed.

The complexity of the problem can be reduced by the discretization of the course angle of the UAV, that is, the course angle of the UAV can be expressed as follows:

$$H = \left\{ \beta_{gi}; \beta_{gi} = \frac{2\pi i}{N_g}, i=0,1,\ldots,N_g-1 \right\} \tag{11}$$

wherein $N_g$ represents the dispersion of the course angle. Because the path planning is made based on the ground speed of the UAV, this document proposes to change the UAV airspeed course angle $\beta_a$ such that the UAV groundspeed course angle $\beta_g$ meets the above set of course angles, that is:

$$H = \left\{ \beta_{gi}; \beta_{gi} = \frac{2\pi i}{N_g}, i=0,1,\ldots,N_g-1 \right\} \tag{12}$$

When $N_g=36$, the experimental error can be controlled within the acceptable range.

Figure 7:
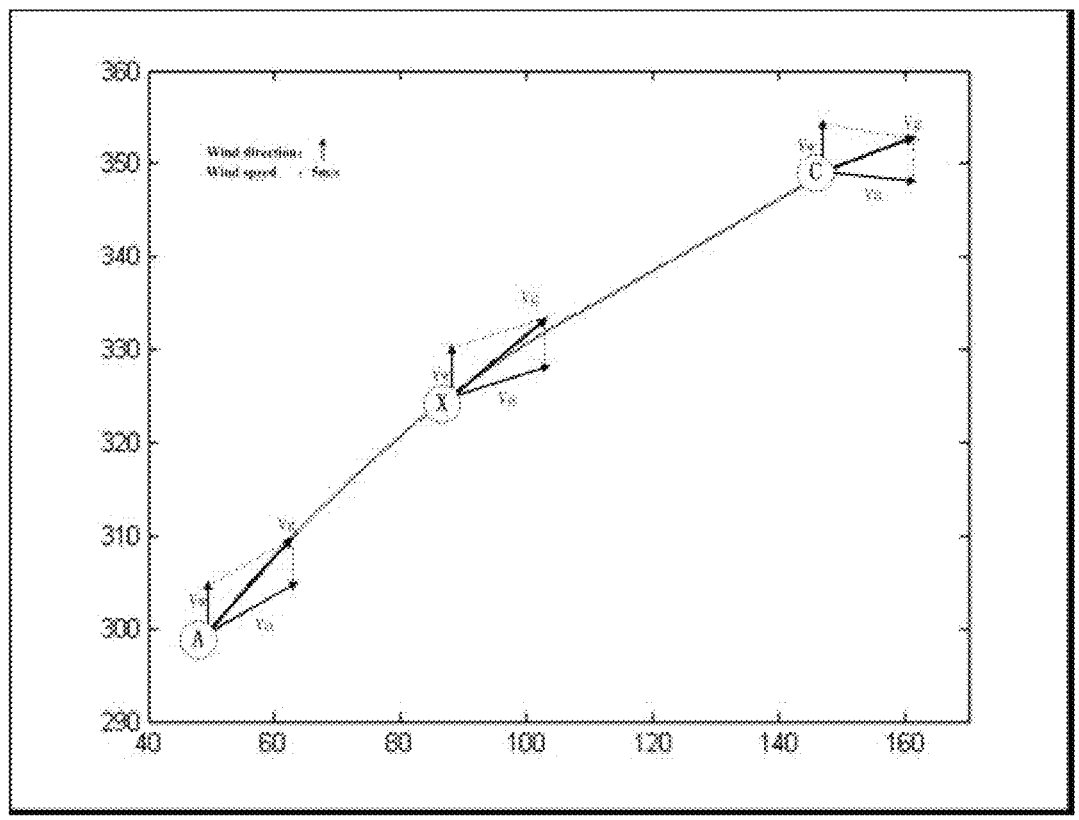
FIG. 7 is illustrates a UAV flying from point A to point C affected by the wind field according to an embodiment of the present invention.

The following describes an example with reference to FIG. 7.

The UAV flies from A (50,300) to C (150,350) at a wind speed of 5 m/s with a south wind (Vw=5 m/s, βw=90°). When the UAV is at location X (85,324), the airspeed and groundspeed of the UAV can be obtained from equations (9) and (11), as shown in Table 4-1.

Table 4-1, Comparison table of airspeed and groundspeed of fixed-wing UAV at X (85,324), no-wind and southerly.

|  | Airspeed | Groundspeed |
|---|---|---|
| South wind | 36 km/h, 0° | 40.8 km/h, 28° |
| No wind | 36 km/h, 28° | 36 km/h, 28° |

The fourth step is to configure the target points.

A set of $N_T$ target points may be expressed as follows:

$$T = \{T_0, T_1, T_2, \ldots, T_{N_T}\} \tag{13}$$

The locations and amount of tasks for all the target points in the set are known, $T_0$ represents the starting point of the UAV. In the present invention, there may be different types of tasks on each target point to be executed by the UAV, and in this process, each UAV can only perform one task on a target point, that is, each target point may be visited by different UAVs and each UAV can only visit a particular target point once.

The fifth step is to calculate the flight time.

In UAV task assignment and path planning with flight time as the objective function, the UAV task assignment scheme determines the order in which the UAV visits the target points, the path planning is based on such order, and the UAV flight time, in turn, is calculated by the result of the path planning. As such, the UAV flight time may be used to determine whether the current UAV task assignment and path planning scheme is superior to the known scheme.

Taking into account that the UAV groundspeed $V_g^i$ is a variable, the present invention calculates the UAV flight time by means of integral. $t_{(T_j,\beta_{gj},T_k,\beta_{gk})}^i$ represents the time taken by the UAV $U_i$ to fly from $T_j$ at a course angle $\beta_{gi}$ to $T_k$ at a course angle $\beta_{gk}$ and it may be calculated as follows:

$$t_{(T_j,\beta_{gj},T_k,\beta_{gk})}^i = \sum_{\theta=\beta_{gi}}^{\beta_{gk}} \int_\theta^{\theta+\Delta\theta} \frac{r_{min}}{V_g^i} d\theta, \forall T_j, T_k \in T, \forall U_i \in U \quad (14)$$

wherein $U_i$ represents the UAV performing the task, U represents the set of UAVs, $T_j$ represents the starting point, $\beta_{gi}$ represents the course angle of the UAV at the starting point, $T_k$ represents the ending point, $\beta_{gk}$ represents the course angle of the UAV at the ending point, T represents the set of target points, $r_{min}$ represents the minimum turning radius of the UAV, and $V_g^i$ represents the ground speed of the UAV $U_i$, $\Delta\theta$ is the angular rotation of the UAV $U_i$ and $V_g(\theta)$ is the ground speed of UAV $U_i$ when the groundspeed course angle is $\theta$.

Figure 8:
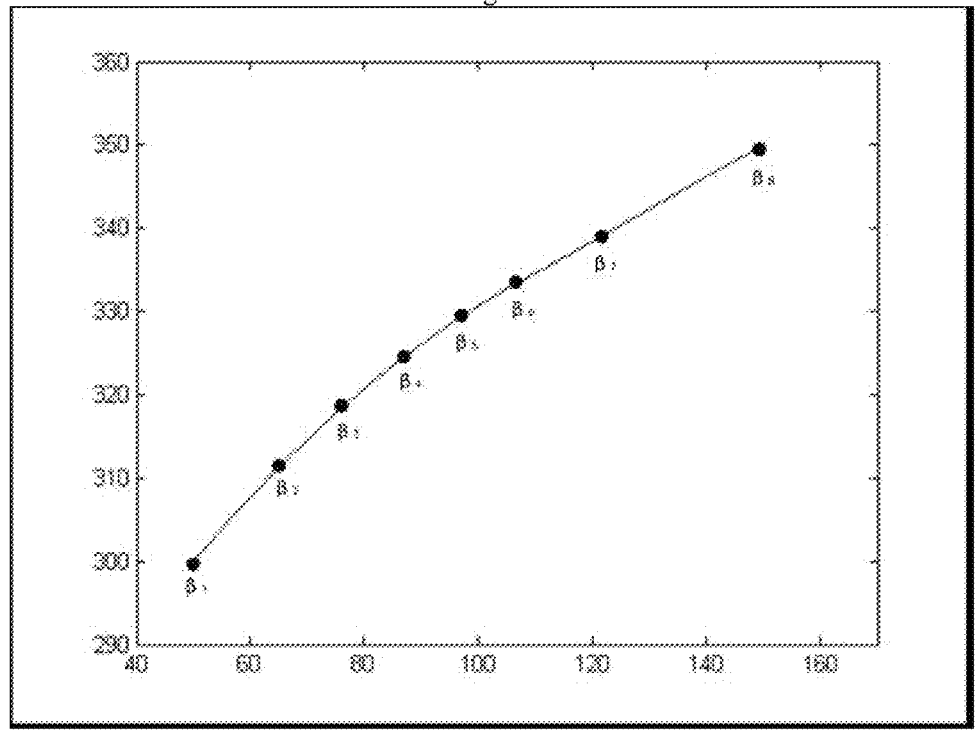
FIG. 8 is a schematic diagram illustrating the segmentation of flight path according to an embodiment of the present invention.
Figure 9A:
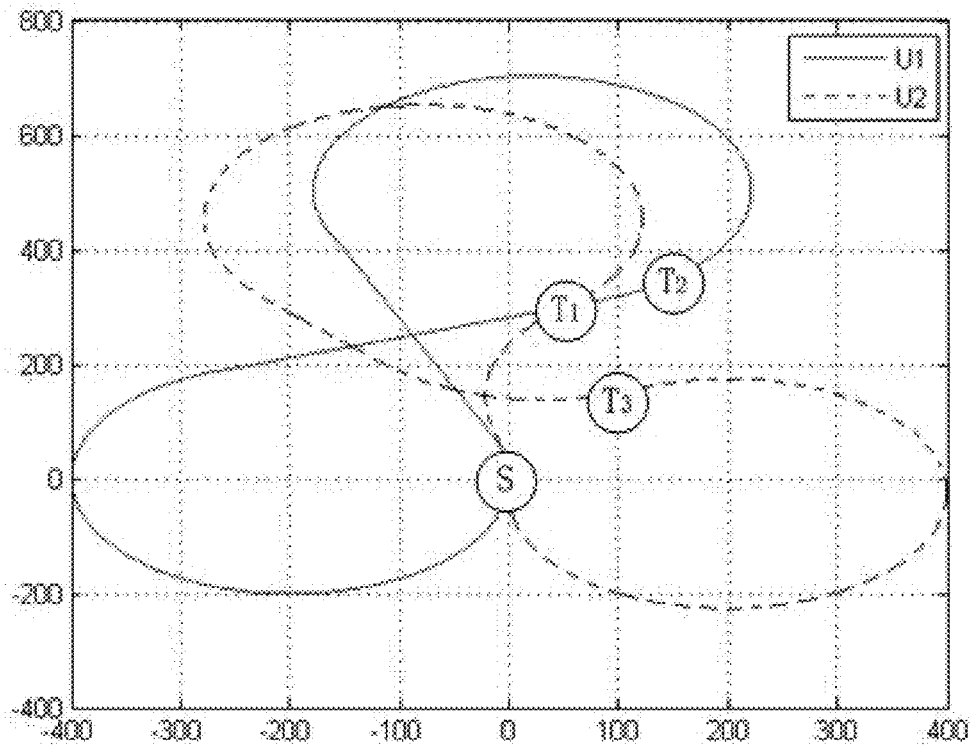
FIGS. 9a-9d illustrate the shortest flight path for the UAV under the effect of west wind, south wind, east wind, and north wind.
Figure 9B:
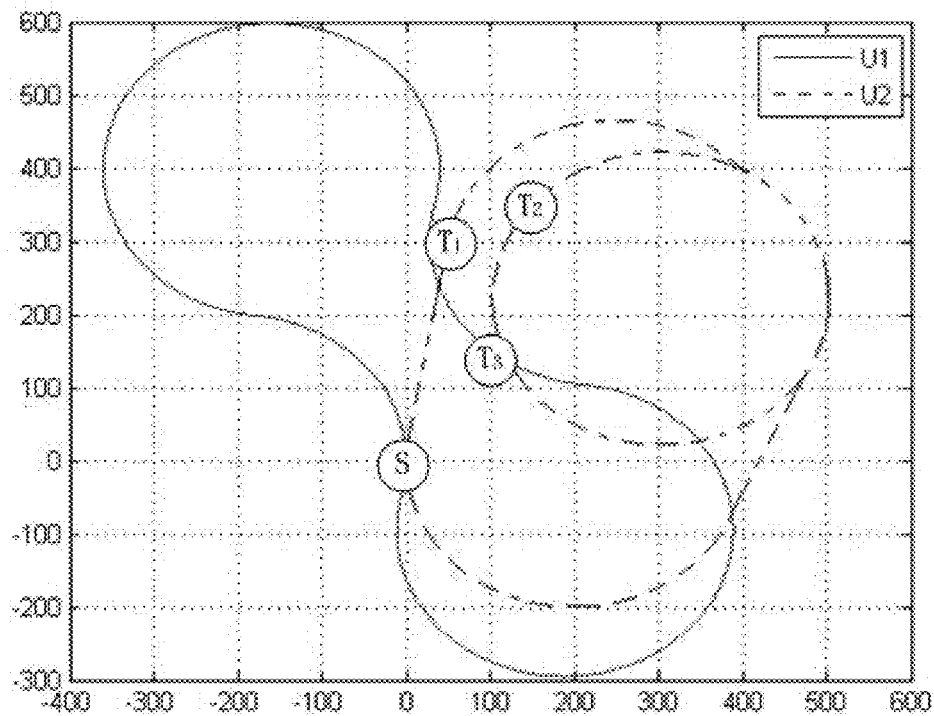
Figure 9C:
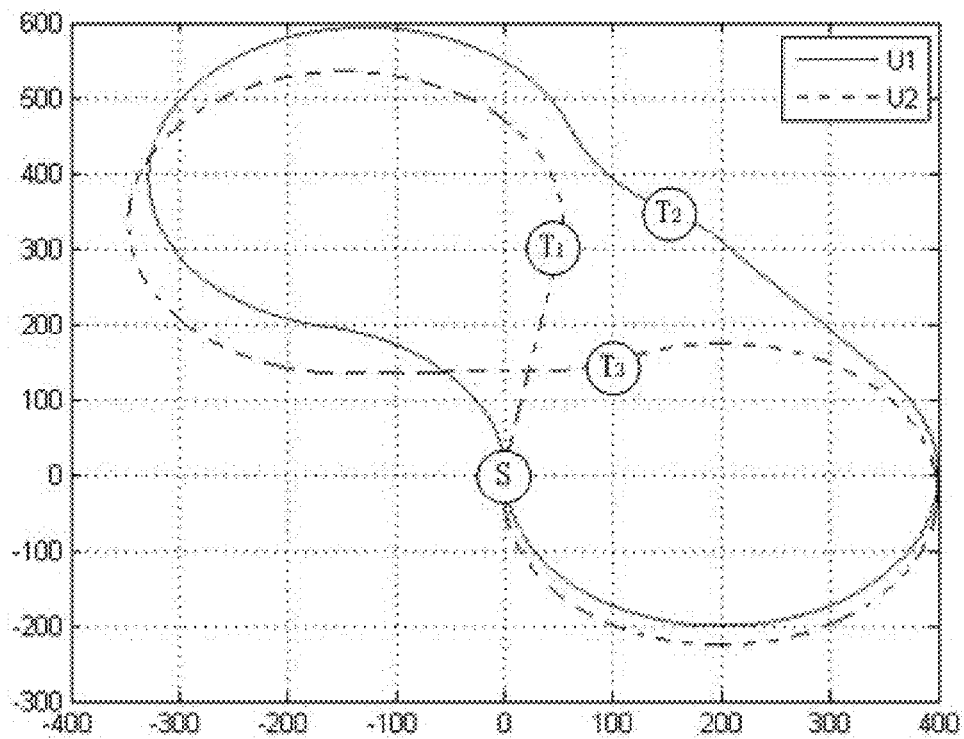
Figure 9D:
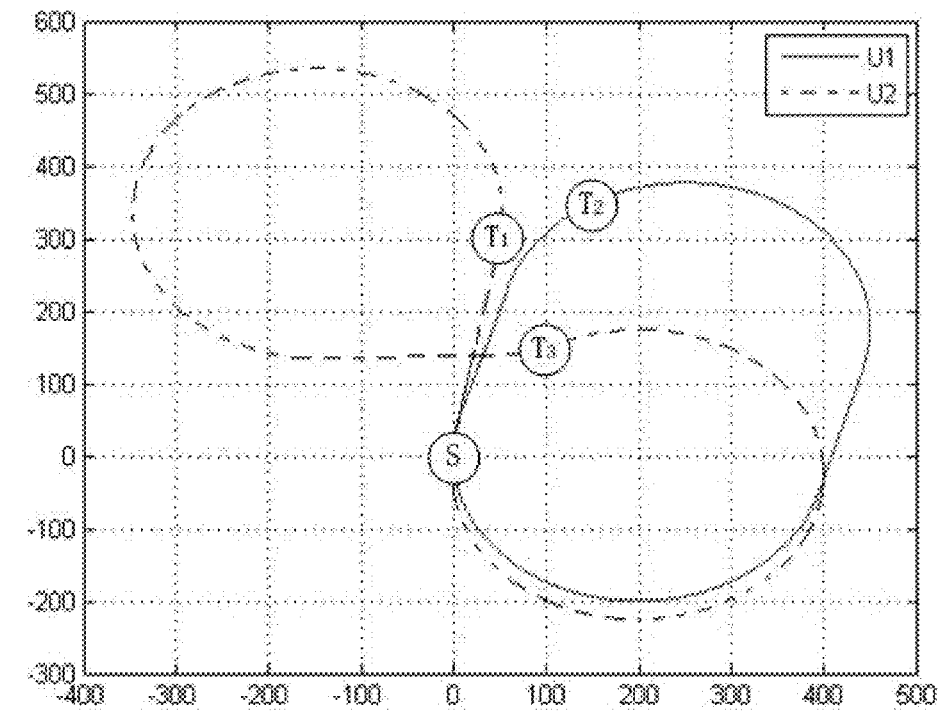

According to above formula and shown in FIG. 8, the UAV flight path from $T_j$ to $T_k$ is divided into several segments according to the change in angle, the groundspeed $V_g^i$ at the starting point of each segment is taken as the flight speed for said segment, whereby the flight time $t_{(T_j,\beta_{gj},T_k,\beta_{gk})}^i$ between two points is obtained. According to the spatial configuration of the fixed-wing UAV, it can be defined as Dubins car model. According to the principle of Dubins path generation, the shortest Dubins path between two points can be generated by a combination of arc path and straight-line path, and the following six situations exist:

$$D=\{LSL,RSR,RSL,LSR,RLR,LRL\}$$

wherein L represents a section of arc of the UAV turning left by radius $r_{min}$, R represents a section of arc of the UAV turning right by radius $r_{min}$, and S indicates that the UAV flies in a straight line. Thus, the time taken by the UAV to fly a Dubins path between any two points can be calculated according to formula (14).

$$J = \max\left\{\sum_{j=0}^{N_T}\sum_{k=0}^{N_T} X_{(T_j,\beta_{gj},T_k,\beta_{gk})}^i t_{(T_j,\beta_{gj},T_k,\beta_{gk})}^i, i=1, K, N_U\right\} \quad (15)$$

Wherein $t_{(T_j,\beta_{gj},T_k,\beta_{gk})}^i$ representing the flight time of UAV $U_i$ between two points $T_j$ and $T_k$ at course angles $\beta_{gj}$ and $\beta_{gk}$ respectively may be calculated according to formula (14) and its constraints satisfy the formula (8);

$$X_{(T_j,\beta_{gj},T_k,\beta_{gk})}^i \in \{0,1\}, \forall i \in \{1, \ldots, N_U\}, \forall j, \quad (16)$$
$$k \in \{0, \ldots, N_T\}, \forall gj, gk \in \{0, \ldots, N_g - 1\}$$

wherein $X_{(T_j,\beta_{gj},T_k,\beta_{gk})}^i$ is a decision variable that is equal to 1 if the UAV $U_i$ flies from a target point $T_j$ at a groundspeed course angle $\beta_{gi}$ to a target point $T_k$ at a groundspeed course angle $\beta_{gk}$, otherwise equal to 0, $N_g$ represents the dispersion of the course angle.

If the value of j and k in J is set to 0, which can be calculated according to formula (15), it means that the UAV departs from the starting point, or the end of the path points to the starting point.

The constraints of the model include:

(1) target point visit constraint: any target points are visited only once;

$$\sum_{i=1}^{N_U}\sum_{k=1}^{N_T}\sum_{gk=0}^{N_g-1}\sum_{gj=0}^{N_g-1} X_{(T_j,\beta_{gj},T_k,\beta_{gk})}^i = 1, \forall j \in T \quad (17)$$

(2) UAV flight path constraint: every UAV departs from the starting point and returns to the starting point after visiting several target points.

$$\sum_{k=1}^{N_T}\sum_{gk=0}^{N_g-1}\sum_{i=1}^{N_U} X_{(T_0,\beta_{g0},T_k,\beta_{gk})}^i = \sum_{k=1}^{N_T}\sum_{gk=0}^{N_g-1}\sum_{i=1}^{N_U} X_{(T_k,\beta_{gk},T_0,\beta_{g0})}^i = N_U \quad (18)$$

$$\sum_{i=1}^{N_U}\sum_{j=0}^{N_T}\sum_{gj=0}^{N_g-1}\sum_{k=0}^{N_T}\sum_{gk=0}^{N_g-1} X_{(T_j,\beta_{gj},T_k,\beta_{gk})}^i = N_T + N_U \quad (19)$$

As can be seen, the flight time for each flight path can be calculated based on the above formulae, whereby the flight path consuming the shortest flight time can be selected.

The present invention is described in detail below with respect to specific examples.

Note that all simulation experiments were carried out in MatlabR2014a environment with 4 G RAM and 3.4 GHz CPU. Specific explanation is as follows.

The UAV model was based on the mathematical model of a small fixed-wing UAV, with airspeed of 10 m/s, a minimum turning radius of 200 m, and a course angle dispersion of 36. The fixed-wing UAVs took off at a course angle of 90° from the starting point S (0,0) and returned to the point S (0,0) at a course angle of 90° after the completion of the task. The wind field environment is fixed, namely, the wind speed and direction are constant during the experiment. In order to ensure the safe flight of the UAV, the wind speed does not exceed 9 m/s and the wind direction is west, south, east and north, namely 0°, 90°, 180° and 270°. The coordinates of the three target points that the UAV needs to visit are T1 (50, 300), T2 (100, 150) and T3 (150, 350).

According to the model and algorithm proposed in the present invention, experiments were carried out under the test scenarios in the wind field environments with west wind, south wind, east wind and north wind, respectively, with a wind speed of 5 m/s. Table 3-1 shows the task assignment and path planning scheme with two UAVs taking the shortest time to complete the task in the respective wind field environments (see FIGS. 9a-9d).

TABLE 3-1

| West wind | | South wind | | East wind | | North wind | |
|---|---|---|---|---|---|---|---|
| Task assignment | Flight time (s) | Task assignment | Flight time (s) | Task assignment | Flight time (s) | Task assignment | Flight time (s) |
| (U1, T2, 220°) (U2, T1, 40°)→ (U2, T3, 20°) | 222.0900 201.5115 | (U2, T3, 320°) (U2, T1, 80°)→ (U2, T2, 50°) | 229.8906 321.0472 | (U1, T2, 330°) (U2, T1, 40°)→ (U2, T3, 20°) | 211.6616 179.1433 | (U1, T2, 30°) (U2, T1, 70°)→ (U2, T3, 20°) | 178.6115 177.7637 |

For a brief description, the method embodiments are described as a series of combinations of actions for the sake of brief description. However, those skilled in the art should understand that the embodiments of the present disclosure are not limited to the sequence of actions described because, according to the embodiments of the present disclosure, some steps may be performed in other sequences or simultaneously. Furthermore, those skilled in the art should also know that the embodiments described in the specification belong to the preferred embodiments, and the actions involved are not necessarily required in the embodiments of the present invention.

Figure 10:
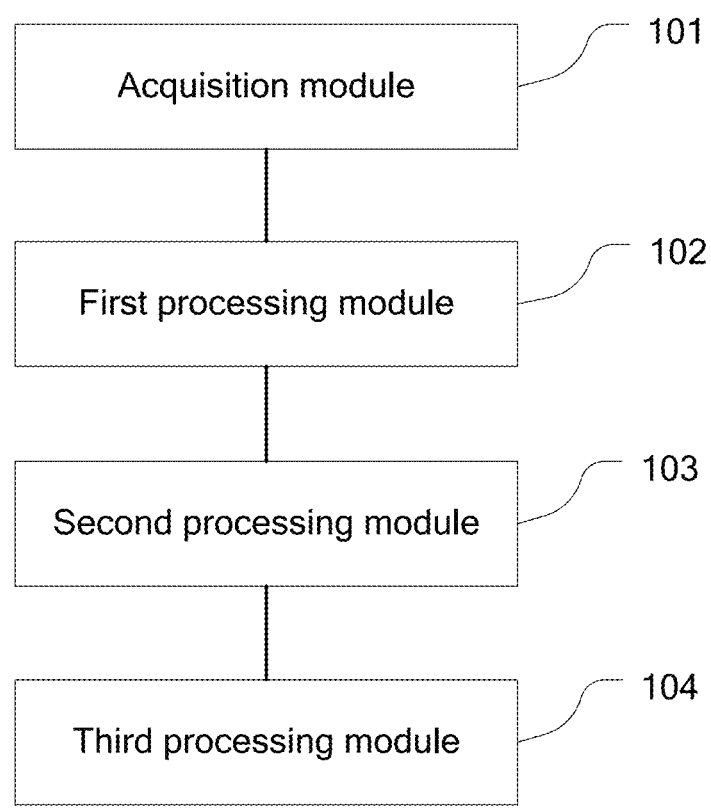
FIG. 10 is a schematic structural diagram of an apparatus for joint optimization of multi-UAV task assignment and path planning according to an embodiment of the present invention.

FIG. 10 is a schematic structural diagram of an apparatus for joint optimization of multi-UAV task assignment and path planning according to an embodiment of the present invention, comprising:

an acquisition module 101 configured to obtain the location information of a plurality of UAVs and a plurality of target points, the dispersion of groundspeed course angle of the UAVs, and motion parameters of each UAV and wind field;

a first processing module 102 configured to construct an initial population based on the location information of the plurality of UAVs and the plurality of target points, the dispersion of groundspeed course angle of the UAVs and a preset genetic algorithm, each chromosome in the initial population including the same number of Dubins flight paths as the number of UAVs and each of the Dubins flight paths being completed by a different UAV;

a second processing module 103 configured to determine the flight status of each UAV and the flight time taken by each UAV to complete a path segment of the corresponding Dubins flight path based on the initial population and the motion parameters of each UAV and wind field, and to obtain the total time taken by all the UAVs corresponding to each chromosome in the initial population to complete the task based on the flight time of the path segment and an MUAV-VS-DVRP model; and a third processing module 104 configured to subject the chromosomes in the initial population to crossover and mutation based on the genetic algorithm and, when a predetermined number of iterations is reached, select the Dubins flight path corresponding to the chromosome with all the UAVs taking the shortest time to complete the task as the jointly-optimized task assignment and path planning scheme for the UAVs.

As can be seen, the present embodiment obtains the actual flight status of the UAVs in the wind field by analyzing motion parameters of the wind field and the UAVs and then plans the flight path based on the actual flight status. As compared with the prior art which assumes that the UAV speed is constant, the present embodiment achieves better flight path planning with the actual flight environment taken into consideration, making it possible to precisely calculate the flight time of UAVs on all possible flight paths, whereby the optimal flight path may be selected.

The following describes the various functional modules of the apparatus in detail.

The first processor module 102 is configured to perform chromosome coding according to coding scheme of the preset genetic algorithm to generate an initial population of a predetermined size; the chromosome consisting of target point information, UAV groundspeed course angle information and UAV information; wherein the target point belongs to a set $T=\{T_0, T_1, T_2, \ldots, T_{N_T}\}$, in which $T_0$ represents a starting point of the UAVs, the UAV groundspeed course angle belongs to a set $$H = \left\{\beta_{gi}; \beta_{gi} = \frac{2\pi i}{N_g}, i = 0, 1, \ldots, N_g - 1\right\},$$

in which $N_g$ represents the dispersion of groundspeed course angle of the UAVs, and the UAV belongs to a set $U=\{U_1, U_2, \ldots, U_{N_U}\}$, in which $N_U$ represents the number of UAVs;

wherein the first row in the chromosome is a random full permutation of the target points, the second row is a corresponding groundspeed course angle randomly selected for each target point based on the dispersion of course angle of the UAVs, and the third row is a corresponding UAV randomly selected for each target point based on the set of UAVs, it is ensured that all the UAVs in the set are selected at least once.

The second processing module 103 is configured to divide the Dubins flight path corresponding to each chromosome into a plurality of path segments based on the order in which the target points comprised in the flight path are visited, and to perform a first step and a second step;

the first step comprising:

calculating the flight time of a UAV $U_i$ that flies from a target point $T_j$ at a groundspeed course angle $\beta_{gj}$ to a target point $T_k$ at a groundspeed course angle $\beta_{gk}$ according to the following formula:

$$t^i_{(T_j,\beta_{gj},T_k,\beta_{gk})} = \sum_{\theta=\beta_{gj}}^{\beta_{gk}} \int_{\theta}^{\theta+\Delta\theta} \frac{r_{min}}{V^i_g} d\theta, \forall T_j, T_k \in T, \forall U_i \in U$$

wherein $U_i$ represents the UAV performing the task, U represents the set of UAVs, $T_j$ represents the starting point, $\beta_{gj}$ represents the course angle of the UAV at the starting point, $T_k$ represents the ending point, $\beta_{gk}$ represents the course angle of the UAV at the ending point, T represents the set of target points, $r_{min}$ represents the minimum turning radius of the UAV, and $V_g^i$ represents the ground speed of the UAV $U_i$, $\Delta\theta$ is the angular rotation of the UAV $U_i$ and $V_g(\theta)$ is the ground speed of UAV $U_i$ when the groundspeed course angle is $\theta$;

obtaining ground speed of the UAV according to the following formula:

$$\begin{pmatrix} \cos\beta_g^i \\ \sin\beta_g^i \end{pmatrix} \cdot V_g^i = \begin{pmatrix} \cos\beta_a^i & \cos\beta_w^i \\ \sin\beta_a^i & \sin\beta_w^i \end{pmatrix} \begin{pmatrix} V_a^i \\ V_w^i \end{pmatrix}$$

wherein $V_a^i$ represents the airspeed, $\beta_a^i$ represents the airspeed course angle, $V_g^i$ represents the groundspeed course angle, $\beta_g^i$ represents the groundspeed course angle, $V_w^i$ represents the wind speed, and $\beta_w^i$ represents the wind direction;

the second step comprising: obtaining the time to complete the task according to the MUAV-VS-DVRP model:

$$J = \max\left\{ \sum_{j=0}^{N_T} \sum_{k=0}^{N_T} X_{(T_j,\beta_{gj},T_k,\beta_{gk})}^i t_{(T_j,\beta_{gj},T_k,\beta_{gk})}^i, i = 1, K, N_U \right\}$$

wherein the constraints are:

$$\sum_{i=1}^{N_U} \sum_{k=1}^{N_T} \sum_{gk=0}^{N_g-1} \sum_{gj=0}^{N_g-1} X_{(T_j,\beta_{gj},T_k,\beta_{gk})}^i = 1, \forall T_j \in T$$

$$\sum_{k=1}^{N_T} \sum_{gk=0}^{N_g-1} \sum_{i=1}^{N_U} X_{(T_0,\beta_{g0},T_k,\beta_{gk})}^i = \sum_{k=1}^{N_T} \sum_{gk=0}^{N_g-1} \sum_{i=1}^{N_U} X_{(T_k,\beta_{gk},T_0,\beta_{g0})}^i = N_U$$

$$\sum_{i=1}^{N_U} \sum_{j=0}^{N_T} \sum_{gj=0}^{N_g-1} \sum_{k=0}^{N_T} \sum_{gk=0}^{N_g-1} X_{(T_j,\beta_{gj},T_k,\beta_{gk})}^i = N_T + N_U$$

wherein $\beta_{gi}$ and $\beta_{gk}$ represent the course angle of UAV $U_i$ at two target points $T_j$ and $T_k$ respectively, $t_{(T_j,\beta_{gj},T_k,\beta_{gk})}^i$ represents the flight time of UAV $U_i$ flying from a target point $T_j$ at a groundspeed course angle $\beta_{gi}$ to a target point $T_k$ at a groundspeed course angle $\beta_{gk}$, $X_{(T_j,\beta_{gj},T_k,\beta_{gk})}^i$ is a binary decision variable that is equal to 1 if the UAV a flies from a target point $T_j$ at a groundspeed course angle $\beta_{gi}$ to a target point $T_k$ at a groundspeed course angle $\beta_{gk}$, otherwise equal to 0, $N_T$ represents the number of target points, and $N_g$ represents the divergence of groundspeed course angle of the UAV.

The third processing module 104 is configured to perform steps comprising: a first step of generating an initial solution and an initial population of a predetermined size using the coding scheme, and calculating fitness of each chromosome in the population based on the time taken by the chromosome to complete the task, wherein the initial solution is the generated first chromosome;

a second step of subjecting two individuals (A, B) selected from the parent population by roulette wheel selection method to crossover. The rule of crossover comprises: step 1, randomly selecting a crossover position in the individual A, then finding a gene in the individual B that is the same as the first row at the crossover position of the individual A, replacing the genes at the crossover position in the chromosomes A and B to obtain new chromosomes C and D, and then skipping to step 2; step 2, determining whether the chromosomes C and D satisfy constraints of the MUAV-VS-DVRP model, if so, skipping to step 3, otherwise, skipping to step 4; step 3, replacing the chromosomes A and B in the population with the chromosomes C and D and skipping to step 7; step 4, performing constraint check for the chromosomes that do not satisfy the constraints, that is, when it is determined that the number of UAVs in the chromosomes A and B does not satisfy the constraints, randomly selecting a gene locus in the chromosome that does not satisfy the constraints and determining whether there exists two or more UAV codes at this gene locus, if yes, skipping to step 5, otherwise skipping to step 6; step 5, placing the missing UAV code into the gene locus and skipping to step 7; step 6, re-selecting a gene locus to generate a chromosome satisfying the constraints to replace the chromosomes A and B, and then skipping to step 7; step 7, iteratively updating the population of the first step to obtain a new offspring population;

a third step of subjecting a chromosome selected from the population of the second step by roulette wheel selection method to mutation, the mutation including at least one of target point mutation of the first row of the chromosome, groundspeed course angle mutation of the second row of the chromosome, and UAV mutation of the third row of the chromosome;

the mutation process of the entire chromosome comprises the following steps: step 1, if mutation has occurred to the order of the first row of the chromosome, randomly selecting two gene locus of the current chromosome and exchanging target point codes at the corresponding gene locus, and then skipping to step 2; step 2, determining whether mutation has occurred to the second row and the locus of mutation and, if the mutation has occurred, randomly generating a value different from the groundspeed course angle code of the UAV at the current locus to replace the initial code, and then skipping to step 3; step 3, determining whether mutation has occurred to the third row and the locus of mutation and, if the mutation has occurred, skipping to step 4, otherwise skipping to step 8; step 4, randomly generating a value different from the UAV code at the current locus to replace the initial code, and after the mutation, determining whether the resulting chromosome satisfies the constraints of the MUAV-VS-DVRP model, if so, skipping to step 8, otherwise skipping to step 5; step 5, performing constraint check for the chromosome that does not satisfy the constraints such that when it is determined that the number of UAVs in the chromosome does not satisfy the constraints, randomly selecting a gene locus in the chromosome that does not satisfy the constraints and determining whether there exists two or more UAV codes at said gene locus, if yes, skipping to step 6, otherwise skipping to step 7; step 6, placing the missing UAV code into the gene locus and skipping to step 8; step 7, re-selecting a gene locus to generate a chromosome satisfying the constraints to replace the chromosomes in the population and skipping to step 8; step 8, replacing the chromosome in the population with the resulting chromosome and iteratively updating the population of the second step to obtain a new offspring population;

a fourth step of calculating the fitness of the offspring population and selecting the optimal solution from all the solutions in this iteration; and a fifth step of determining whether the current number of iterations reaches a preset value; if no, combining the offspring population and the parent population in the third step according to a certain proportion to form a new parent population and returning to the second step; and if yes, ending the iteration and taking the ultimate optimal solution as the UAV task assignment and path planning result.

Since the apparatus implementation is basically similar to the method implementation, the description is relatively simple. For details, reference may be made to the description of the method implementation.

It should be noted that among the various components of the apparatus of the present invention, they are logically divided according to the functions they need to realize. However, the present invention is not limited thereto, and the components can be re-divided or combined as needed.

The respective components of the present invention may be implemented in hardware or in software modules running on one or more processors, or in a combination of the two. In the present apparatus, the PC enables remote control of the device or apparatus through the Internet and precisely controls each operation of the device or apparatus. The present invention may also be implemented as a part or all of the device or apparatus programs for performing the methods described herein (e.g., computer programs and computer program products). Such a program implementing the invention may be stored on a computer readable medium and the files or documents produced by the program are statistically significant, data report or cpk report may be produced, batch test and statistics may be carried out. It is to be noted that the above embodiments illustrate rather than limit the invention, and those skilled in the art may design alternative embodiments without departing the scope of the appended claims. In the claims, any reference sign placed between the parentheses shall not be construed as limiting to a claim. The word "comprise" does not exclude the presence of an element or a step not listed in a claim. The word "a" or "an" preceding an element does not exclude the presence of a plurality of such elements. The invention may be implemented by means of a hardware comprising several distinct elements and by means of a suitably programmed computer. In a unit claim enumerating several devices, several of the devices may be embodied by one and the same hardware item. Use of the words "first, second, and third", etc. does not mean any ordering. Such words may be construed as naming.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent substitutions to some technical features of the technical solutions, as long as these modifications or substitutions do not cause the essence of corresponding technical solutions to depart from the spirit and scope of the technical solutions in the embodiments of the present invention.

The invention claimed is:

1. A method for joint optimization of multi-UAV task assignment and path planning, comprising:
   a step S1 of obtaining the location information of a plurality of UAVs and a plurality of target points, the dispersion of groundspeed course angle of the UAVs, and motion parameters of each UAV and wind field;
   a step S2 of constructing an initial population based on the location information of the plurality of UAVs and the plurality of target points, the dispersion of groundspeed course angle of the UAVs and a preset genetic algorithm, each chromosome in the initial population including the same number of Dubins flight paths as the number of UAVs and each of the Dubins flight paths being completed by a different UAV;
   a step S3 of determining the flight status of each UAV and the flight time taken by each UAV to complete a path segment of the corresponding Dubins flight path based on the initial population and the motion parameters of each UAV and wind field, and obtaining the total time taken by all the UAVs corresponding to each chromosome in the initial population to complete the task based on the flight time of the path segment and an MUAV-VS-DVRP model; and
   a step S4 of subjecting the chromosomes in the initial population to crossover and mutation based on the genetic algorithm and, when a predetermined number of iterations is reached, selecting the Dubins flight path corresponding to the chromosome with all the UAVs taking the shortest time to complete the task as the jointly-optimized task assignment and path planning scheme for the UAVs.

2. The method according to claim 1, wherein the step of constructing the initial population based on the location information of a plurality of UAVs and a plurality of target points comprises:
   performing chromosome coding according to coding scheme of the preset genetic algorithm to generate an initial population of a predetermined size; the chromosome consisting of target point information, UAV groundspeed course angle information and UAV information; wherein the target point belongs to a set $T=\{T_0, T_1, T_2, \ldots, T_{N_T}\}$, in which $T_0$ represents a starting point of the UAVs, the UAV groundspeed course angle belongs to a set $$H = \left\{\beta_{gi}; \beta_{gi} = \frac{2\pi i}{N_g}, i = 0, 1, \ldots, N_g - 1\right\},$$

in which $N_g$ represents the dispersion of groundspeed course angle of the UAVs, and the UAV belongs to a set $U=\{U_1, U_2, \ldots, U_{N_U}\}$, in which $N_U$ represents the number of UAVs, and $\beta_{gi}$ represents groundspeed course angle;
   wherein the first row in the chromosome is a random full permutation of the target points, the second row is a corresponding groundspeed course angle randomly selected for each target point based on the dispersion of course angle of the UAVs, and the third row is a corresponding UAV randomly selected for each target point based on the set of UAVs, it is ensured that all the UAVs in the set of UAVs are selected at least once.

3. The method according to claim 2, wherein the step of determining the flight status of each UAV and the flight time taken by each UAV to complete a path segment of the corresponding Dubins flight path based on the initial population and the motion parameters of each UAV and wind field, and obtaining the total time taken by all the UAVs corresponding to each chromosome in the initial population to complete the task based on the flight time of the path segment and an MUAV-VS-DVRP model comprises:

dividing the Dubins flight path corresponding to each chromosome into a plurality of path segments based on the order in which the target points comprised in the flight path are visited;

determining the UAV flight status based on the coordinates and course angle of the starting and ending points corresponding to each path segment in combination with wind field parameters and thus obtaining the flight time taken by the UAV to complete the path segment; and obtaining the total time taken by all the UAVs corresponding to the chromosome to complete the task based on the flight time corresponding to each path segment.

4. The method according to claim 3, wherein determining the UAV flight status based on the coordinates and course angle of the starting and ending points corresponding to each path segment in combination with wind field parameters and thus obtaining the flight time taken by the UAV to complete the path segment comprises:

calculating the flight time of a UAV $U_i$ that flies from a target point $T_j$ at a groundspeed course angle $\beta_{gi}$ to a target point $T_k$ at a groundspeed course angle $\beta_{gk}$ according to the following formula:

$$t^i_{(T_j,\beta_{gi},T_k,\beta_{gk})} = \sum_{\theta=\beta_{gi}}^{\beta_{gk}} \int_{\theta}^{\theta+\Delta\theta} \frac{r_{min}}{V^i_g} d\theta, \forall U_i \in U, \forall T_j, T_k \in T$$

wherein $U_i$ represents the UAV performing the task, U represents the set of UAVs, $T_j$ represents the starting point, $\beta_{gi}$ represents the course angle of the UAV at the starting point, $T_k$ represents the ending point, $\beta_{gk}$ represents the course angle of the UAV at the ending point, T represents the set of target points, $r_{min}$ represents the minimum turning radius of the UAV, and $V_g^i$ represents the ground speed of the UAV $U_i$, $\Delta\theta$ is the angular rotation of the UAV $U_i$ and $V_g(\theta)$ is the ground speed of UAV $U_i$ when the groundspeed course angle is $\theta$;

obtaining ground speed of the UAV according to the following formula:

$$\begin{pmatrix} \cos\beta^i_g \\ \sin\beta^i_g \end{pmatrix} \cdot V^i_g = \begin{pmatrix} \cos\beta^i_a & \cos\beta^i_w \\ \sin\beta^i_a & \sin\beta^i_w \end{pmatrix} \begin{pmatrix} V^i_a \\ V^i_w \end{pmatrix}$$

wherein $V_a^i$ represents the airspeed, $\beta_a^i$ represents the airspeed course angle, $V_g^i$ represents the groundspeed, $\beta_g^i$ represents the ground speed course angle, $V_w^i$ represents the wind speed, and $\beta_w^i$ represents the wind direction.

5. The method according to claim 4, wherein the step of subjecting the chromosomes in the initial population to crossover and mutation based on the genetic algorithm and, when a predetermined number of iterations is reached, selecting the Dubins flight path corresponding to the chromosome with all the UAVs taking the shortest time to complete the task as the jointly-optimized task assignment and path planning scheme for the UAVs comprises:

a first step of generating an initial solution and an initial population of a predetermined size using the coding scheme, and calculating fitness of each chromosome in the population based on the time taken by the chromosome to complete the task;

a second step of subjecting two individuals (A, B) selected from the parent population by roulette wheel selection method to crossover, and the rule of the crossover comprise: step 1, randomly selecting a crossover position in the individual A, then finding a gene in the individual B that is the same as the first row at the crossover position of the individual A, replacing the genes at the crossover position in the chromosomes A and B to obtain new chromosomes C and D, and then skipping to step 2; step 2, determining whether the chromosomes C and D satisfy constraints of the MUAV-VS-DVRP model, if so, skipping to step 3, otherwise, skipping to step 4; step 3, replacing the chromosomes A and B in the population with the chromosomes C and D and skipping to step 7; step 4, performing constraint check for the chromosomes that do not satisfy the constraints, that is, when it is determined that the number of UAVs in the chromosomes A and B does not satisfy the constraints, randomly selecting a gene locus in the chromosome that does not satisfy the constraints and determining whether there exists two or more UAV codes at this gene locus, if yes, skipping to step 5, otherwise skipping to step 6; step 5, placing the missing UAV code into the gene locus and skipping to step 7; step 6, re-selecting a gene locus to generate a chromosome satisfying the constraints to replace the chromosomes A and B, and then skipping to step 7; step 7, iteratively updating the population of the first step to obtain a new offspring population;

a third step of subjecting a chromosome selected from the population of the second step by roulette wheel selection method to mutation, the mutation including at least one of target point mutation of the first row of the chromosome, groundspeed course angle mutation of the second row of the chromosome, and UAV mutation of the third row of the chromosome;

the mutation process of the entire chromosome comprises the following steps: step 1, if mutation has occurred to the order of the first row of the chromosome, randomly selecting two gene locus of the current chromosome and exchanging target point codes at the corresponding gene locus, and then skipping to step 2; step 2, determining whether mutation has occurred to the second row and the locus of mutation and, if the mutation has occurred, randomly generating a value different from the groundspeed course angle code of the UAV at the current locus to replace the initial code, and then skipping to step 3; step 3, determining whether mutation has occurred to the third row and the locus of mutation and, if the mutation has occurred, skipping to step 4, otherwise skipping to step 8; step 4, randomly generating a value different from the UAV code at the current locus to replace the initial code, and after the mutation, determining whether the resulting chromosome satisfies the constraints of the MUAV-VS-DVRP model, if so, skipping to step 8, otherwise skipping to step 5; step 5, performing constraint check for the chromosome that does not satisfy the constraints such that when it is determined that the number of UAVs in the chromosome does not satisfy the constraints, randomly selecting a gene locus in the chromosome that does not satisfy the constraints and determining whether there exists two or more UAV codes at said gene locus, if yes, skipping to step 6, otherwise skipping to step 7; step 6, placing the missing UAV code into the gene locus and skipping to step 8; step 7, re-selecting a gene locus to generate a chromosome satisfying the constraints to replace the chromosomes in the population and skipping to step 8; step 8, replacing the chromosome in the population with the resulting chromosome and iteratively updating the population of the second step to obtain a new offspring population;

a fourth step of calculating the fitness of the offspring population and selecting the optimal solution from all the solutions in this iteration; and a fifth step of determining whether the current number of iterations reaches a preset value; if no, combining the offspring population and the parent population in the third step according to a certain proportion to form a new parent population and returning to the second step; and if yes, ending the iteration and taking the ultimate optimal solution as the UAV task assignment and path planning result.

6. The method according to claim 3, wherein obtaining the total time taken by all the UAVs corresponding to each chromosome in the initial population to complete the task based on the flight time and the MUAV-VS-DVRP model comprises:

obtaining the time taken to complete the task according to the MUAV-VS-DVRP model:

$$J = \max\left\{\sum_{j=0}^{N_T}\sum_{k=0}^{N_T} X^i_{(T_j,\beta_{gj},T_k,\beta_{gk})} t^i_{(T_j,\beta_{gj},T_k,\beta_{gk})}, i=1,K,N_U\right\}$$

wherein the constraints are:

$$\sum_{i=1}^{N_U}\sum_{k=1}^{N_T}\sum_{gk=0}^{N_g-1}\sum_{gj=0}^{N_g-1} X^i_{(T_j,\beta_{gj},T_k,\beta_{gk})} = 1, \forall\, T_j \in T$$

$$\sum_{k=1}^{N_T}\sum_{gk=0}^{N_g-1}\sum_{i=1}^{N_U} X^i_{(T_0,\beta_{g0},T_k,\beta_{gk})} = \sum_{k=1}^{N_T}\sum_{gk=0}^{N_g-1}\sum_{i=1}^{N_U} X^i_{(T_k,\beta_{gk},T_0,\beta_{g0})} = N_U$$

$$\sum_{i=1}^{N_U}\sum_{j=0}^{N_T}\sum_{gj=0}^{N_g-1}\sum_{k=0}^{N_T}\sum_{gk=0}^{N_g-1} X^i_{(T_j,\beta_{gj},T_k,\beta_{gk})} = N_T + N_U$$

wherein $\beta_{gi}$ and $\beta_{gk}$ represent the course angle of UAV $U_i$ at two target points $T_j$ and $T_k$ respectively, $t^i_{(T_j,\beta_{gj},T_k,\beta_{gk})}$ represents the flight time of UAV $U_i$ flying from a target point $T_j$ at a groundspeed course angle $\beta_{gj}$ to a target point $T_k$ at a groundspeed course angle $\beta_{gk}$, $X^i_{(T_j,\beta_{gj},T_k,\beta_{gk})}$ is a binary decision variable that is equal to 1 if the UAV $U_i$ flies from a target point $T_j$ at a groundspeed course angle $\beta_{gj}$ to a target point $T_k$ at a groundspeed course angle $\beta_{gk}$, otherwise equal to 0, $N_T$ represents the number of target points, $N_g$ represents the divergence of groundspeed course angle of the UAV, and $U_i$ represents the UAV preforming the above tasks.

7. An apparatus for joint optimization of multi-UAV task assignment and path planning, comprising:

an acquisition module configured to obtain the location information of a plurality of UAVs and a plurality of target points, the dispersion of groundspeed course angle of the UAVs, and motion parameters of each UAV and wind field;

a first processing module configured to construct an initial population based on the location information of the plurality of UAVs and the plurality of target points, the dispersion of groundspeed course angle of the UAVs and a preset genetic algorithm, each chromosome in the initial population including the same number of Dubins flight paths as the number of UAVs and each of the Dubins flight paths being completed by a different UAV;

a second processing module configured to determine the flight status of each UAV and the flight time taken by each UAV to complete a path segment of the corresponding Dubins flight path based on the initial population and the motion parameters of each UAV and wind field, and to obtain the total time taken by all the UAVs corresponding to each chromosome in the initial population to complete the task based on the flight time of the path segment and an MUAV-VS-DVRP model; and a third processing module configured to subject the chromosomes in the initial population to crossover and mutation based on the genetic algorithm and, when a predetermined number of iterations is reached, select the Dubins flight path corresponding to the chromosome with all the UAVs taking the shortest time to complete the task as the jointly-optimized task assignment and path planning scheme for the UAVs.

8. The apparatus according to claim 7, wherein the first processing module is further configured to perform chromosome coding according to coding scheme of the preset genetic algorithm to generate an initial population of a predetermined size; the chromosome consisting of target point information, UAV groundspeed course angle information and UAV information; wherein the target point belongs to a set $T = \{T_0, T_1, T_2, \ldots, T_{N_T}\}$, in which $T_0$ represents a starting point of the UAVs, the UAV groundspeed course angle belongs to a set $$H = \left\{\beta_{gi}; \beta_{gi} = \frac{2\pi i}{N_g}, i = 0, 1, \ldots, N_g - 1\right\},$$

in which $N_g$ represents the dispersion of groundspeed course angle of the UAVs, and the UAV belongs to a set $U = \{U_1, U_2, \ldots, U_{N_U}\}$, in which $N_U$ represents the number of UAVs, and $\beta_{gi}$ represents groundspeed course angle;

wherein the first row in the chromosome is a random full permutation of the target points, the second row is a corresponding groundspeed course angle randomly selected for each target point based on the dispersion of course angle of the UAVs, and the third row is a corresponding UAV randomly selected for each target point based on the set of UAVs, it is ensured that all the UAVs in the set of UAVs are selected at least once.

9. The apparatus according to claim 8, wherein the second processing module is further configured to divide the Dubins flight path corresponding to each chromosome into a plurality of path segments based on the order in which the target points comprised in the flight path are visited, and to perform a first step and a second step:

the first step comprising:

calculating the flight time of a UAV $U_i$ that flies from a target point $T_j$ at a groundspeed course angle $\beta_{gi}$ to a target point $T_k$ at a groundspeed course angle $\beta_{gk}$ according to the following formula:

$$t^i_{(T_j,\beta_{gj},T_k,\beta_{gk})} = \sum_{\theta=\beta_{gj}}^{\beta_{gk}} \int_{\theta}^{\theta+\Delta\theta} \frac{r_{min}}{V^i_g} d\theta, \forall T_j, T_k \in T, \forall U_i \in U$$

wherein $U_i$ represents the UAV performing the task, U represents the set of UAVs, $T_j$ represents the starting point, $\beta_{gj}$ represents the course angle of the UAV at the starting point, $T_k$ represents the ending point, $\beta_{gk}$ represents the course angle of the UAV at the ending point, T represents the set of target points, $r_{min}$ represents the minimum turning radius of the UAV, and $V_g^i$ represents the ground speed of the UAV $U_i$, $\Delta\theta$ is the angular rotation of the UAV $U_i$ and $V_g(\theta)$ is the ground speed of UAV $U_i$ when the groundspeed course angle is $\theta$; and obtaining ground speed of the UAV according to the following formula:

$$\begin{pmatrix} \cos\beta^i_g \\ \sin\beta^i_g \end{pmatrix} \cdot V^i_g = \begin{pmatrix} \cos\beta^i_a & \cos\beta^i_w \\ \sin\beta^i_a & \sin\beta^i_w \end{pmatrix} \begin{pmatrix} V^i_a \\ V^i_w \end{pmatrix}$$

wherein $V_a^i$ represents the airspeed, $\beta_a^i$ represents the airspeed course angle, $V_g^i$ represents the groundspeed, $\beta_g^i$ represents the groundspeed course angle, $V_w^i$ represents the wind speed, and $\beta_w^i$ represents the wind direction; and the second step comprising: obtaining the flight time according to the MUAV-VS-DVRP model:

$$J = \max\left\{\sum_{j=0}^{N_T}\sum_{k=0}^{N_T} X^i_{(T_j,\beta_{gj},T_k,\beta_{gk})} t^i_{(T_j,\beta_{gj},T_k,\beta_{gk})}, i = 1, K, N_U\right\}$$

wherein the constraints are:

$$\sum_{i=1}^{N_U}\sum_{k=1}^{N_T}\sum_{gk=0}^{N_g-1}\sum_{gj=0}^{N_g-1} X^i_{(T_j,\beta_{gj},T_k,\beta_{gk})} = 1, \forall T_j \in T$$

$$\sum_{k=1}^{N_T}\sum_{gk=0}^{N_g-1}\sum_{i=1}^{N_U} X^i_{(T_0,\beta_{g0},T_k,\beta_{gk})} = \sum_{k=1}^{N_T}\sum_{gk=0}^{N_g-1}\sum_{i=1}^{N_U} X^i_{(T_k,\beta_{gk},T_0,\beta_{g0})} = N_U$$

$$\sum_{i=1}^{N_U}\sum_{j=0}^{N_T}\sum_{gj=0}^{N_g-1}\sum_{k=0}^{N_T}\sum_{gk=0}^{N_g-1} X^i_{(T_j,\beta_{gj},T_k,\beta_{gk})} = N_T + N_U$$

wherein $\beta_{gi}$ and $\beta_{gk}$ represent the course angle of UAV $U_i$ at two target points $T_j$ and $T_k$ respectively, $t^i_{(T_j,\beta_{gj},T_k,\beta_{gk})}$ represents the flight time of UAV $U_i$ flying from a target point $T_j$ at a groundspeed course angle $\beta_{gj}$ to a target point $T_k$ at a groundspeed course angle $\beta_{gk}$, $X^i_{(T_j,\beta_{gj},T_k,\beta_{gk})}$ is a binary decision variable that is equal to 1 if the UAV $U_i$ flies from a target point $T_j$ at a groundspeed course angle $\beta_{gj}$ to a target point $T_k$ at a groundspeed course angle $\beta_{gk}$, otherwise equal to 0, $N_T$ represents the number of target points, $N_g$ represents the divergence of groundspeed course angle of the UAV, and $U_i$ represents the UAV preforming the above tasks.

10. The apparatus according to claim 8, wherein the third processing module is further configured to perform:
a first step of generating an initial solution and an initial population of a predetermined size using the coding scheme, and calculating fitness of each chromosome in the population based on the time taken by the chromosome to complete the task;
a second step of subjecting two individuals (A, B) selected from the parent population by roulette wheel selection method to crossover, and the rule of the crossover comprise: step 1, randomly selecting a crossover position in the individual A, then finding a gene in the individual B that is the same as the first row at the crossover position of the individual A, replacing the genes at the crossover position in the chromosomes A and B to obtain new chromosomes C and D, and then skipping to step 2; step 2, determining whether the chromosomes C and D satisfy constraints of the MUAV-VS-DVRP model, if so, skipping to step 3, otherwise, skipping to step 4; step 3, replacing the chromosomes A and B in the population with the chromosomes C and D and skipping to step 7; step 4, performing constraint check for the chromosomes that do not satisfy the constraints, that is, when it is determined that the number of UAVs in the chromosomes A and B does not satisfy the constraints, randomly selecting a gene locus in the chromosome that does not satisfy the constraints and determining whether there exists two or more UAV codes at this gene locus, if yes, skipping to step 5, otherwise skipping to step 6; step 5, placing the missing UAV code into the gene locus and skipping to step 7; step 6, re-selecting a gene locus to generate a chromosome satisfying the constraints to replace the chromosomes A and B, and then skipping to step 7; step 7, iteratively updating the population of the first step to obtain a new offspring population;
a third step of subjecting a chromosome selected from the population of the second step by roulette wheel selection method to mutation, the mutation including at least one of target point mutation of the first row of the chromosome, groundspeed course angle mutation of the second row of the chromosome, and UAV mutation of the third row of the chromosome;
the mutation process of the entire chromosome comprises the following steps: step 1, if mutation has occurred to the order of the first row of the chromosome, randomly selecting two gene locus of the current chromosome and exchanging target point codes at the corresponding gene locus, and then skipping to step 2; step 2, determining whether mutation has occurred to the second row and the locus of mutation and, if the mutation has occurred, randomly generating a value different from the groundspeed course angle code of the UAV at the current locus to replace the initial code, and then skipping to step 3; step 3, determining whether mutation has occurred to the third row and the locus of mutation and, if the mutation has occurred, skipping to step 4, otherwise skipping to step 8; step 4, randomly generating a value different from the UAV code at the current locus to replace the initial code, and after the mutation, determining whether the resulting chromosome satisfies the constraints of the MUAV-VS-DVRP model, if so, skipping to step 8, otherwise skipping to step 5; step 5, performing constraint check for the chromosome that does not satisfy the constraints such that when it is determined that the number of UAVs in the chromosome does not satisfy the constraints, randomly selecting a gene locus in the chromosome that does not satisfy the constraints and determining whether there exists two or more UAV codes at said gene locus, if yes, skipping to step 6, otherwise skipping to step 7; step 6, placing the missing UAV code into the gene locus and skipping to step 8; step 7, re-selecting a gene locus to generate a chromosome satisfying the constraints to replace the chromosomes in the population and skipping to step 8; step 8, replacing the chromosome in the population with the resulting chromosome and iteratively updating the population of the second step to obtain a new offspring population;

a fourth step of calculating the fitness of the offspring population and selecting the optimal solution from all the solutions in this iteration; and a fifth step of determining whether the current number of iterations reaches a preset value; if no, combining the offspring population and the parent population in the third step according to a certain proportion to form a new parent population and returning to the second step; and if yes, ending the iteration and taking the ultimate optimal solution as the UAV task assignment and path planning result.

* * * * *